United States Patent
Schober et al.

(10) Patent No.: US 6,493,320 B1
(45) Date of Patent: Dec. 10, 2002

(54) AUTOMATIC INITIALIZATION AND TUNING ACROSS A HIGH SPEED, PLESIOCHRONOUS, PARALLEL LINK

(75) Inventors: Richard L. Schober; Yoichi Koyanagi, both of Cupertino; Raghu Sastry, Santa Clara, all of CA (US); Hirotaka Tamura, Atsugi; Kohtaro Gotoh, Kawasaki, both of (JP)

(73) Assignee: Fujitsu Limited (JP)

( * ) Notice: Subject to any disclaimer, the term of this patent is extended or adjusted under 35 U.S.C. 154(b) by 0 days.

(21) Appl. No.: 09/249,825

(22) Filed: Feb. 12, 1999

(51) Int. Cl.[7] ............................................. G01R 31/08
(52) U.S. Cl. ...................................................... 370/241
(58) Field of Search ................................ 370/241, 487, 370/314–319; 423/487, 314–319, 356, 394–396, 387, 408; 375/106, 109–111, 118, 369; 455/13.3, 62–64; 504/62–64, 226.2; 713/600; 348/570, 731, 906; 709/221–223

(56) References Cited

U.S. PATENT DOCUMENTS

| | | | | |
|---|---|---|---|---|
| 4,985,900 A | * | 1/1991 | Rhind et al. | 375/226 |
| 5,420,647 A | * | 5/1995 | Levine | 348/734 |
| 5,572,674 A | * | 11/1996 | Ernst | 709/221 |
| 5,812,928 A | * | 9/1998 | Watson, Jr. et al. | 725/118 |
| 5,860,056 A | * | 1/1999 | Pond | 455/13.3 |
| 5,926,767 A | * | 7/1999 | Olds et al. | 455/504 |

OTHER PUBLICATIONS

Delbert Cecchi, et al., "A 1.0 GB/Second SCI Link in 0.8µ BiCMOS", IBM Corporation, System Technology and Architecture Division, Rochester, MN, pp. 1–24, Mar. 21, 1995.

Hayes, T. C., Horwitz, P., "Student Manual for the Art of Electronics," Cambridge University Press, Chapter 9, pp. 406–430, 1989.

Horowitz, P., Hill., W., "The Art of Electronics," Cambridge University Press, Second Edition, Chapter 9, pp. 641–655, 1989.

* cited by examiner

Primary Examiner—Kwang Bin Yao
Assistant Examiner—Prenell Jones
(74) Attorney, Agent, or Firm—Fenwick & West LLP

(57) ABSTRACT

A method and apparatus automatically initialize and tune a link in a network system. The link couples one router to another router and may be implemented as a high speed, plesiochronous, parallel link. The apparatus includes a first link control unit coupled to a first end of the link and a second link control unit coupled to a second end of the link. The second link control unit is capable of communicating with the first link control unit to achieve automatic adjustment of the operating parameters of the link to maximize signal propagation across and minimize the power consumption of the link. The method of initializing and tuning across a high speed link in a network is also disclosed.

30 Claims, 31 Drawing Sheets

LINK CONTROL MESSAGES  763

| Code | Description | | |
|---|---|---|---|
| 00000000 | Null | | |
| 00000001 ↓ 00000011 | Reserved | | |
| 000001 00 | Let's tune the link in the me-to-you direction. | | |
| 000001 01 | I'm done tuning the link in the me-to-you direction | Failed | |
| 000001 10 | | Passed with iffy margin | |
| 000001 11 | | Passed with full margin | |
| 000001 00 | DC Level Test Pattern | ZERO Level | Normal pattern |
| 000001 01 | | | Receiver error |
| 000001 10 | | ONE Level | Receiver error |
| 000001 11 | | | Normal pattern |
| 000011 00 | AC Pulse Test Pattern | ZERO Pulse | ZERO pulse |
| 000011 01 | | | Field of ONEs |
| 000011 10 | | ONE Pulse | Field of ZEROs |
| 000011 11 | | | ONE pulse |

FIG. 10A

LINK CONTROL MESSAGES
(Start/Stop Tuning) ← 762

| Code | | | Description | |
|---|---|---|---|---|
| | ---- | | Start/stop tuning action in the me-to-you direction. | |
| | 000 | 0 | Reserved | Start |
| | | 1 | | Stop |
| 0001 | 001 | 0 | DC Level Test | Start |
| 0001 | | 1 | | Stop |
| 0001 | 010 | 0 | Incoming Clock Check | Start |
| | | 1 | | Stop |
| 0001 | 011 | 0 | Phase Tune | Start |
| 0001 | | 1 | | Stop |
| 0001 | 100 | 0 | AC Pulse Test | Start |
| | | 1 | | Stop |
| 0001 | 101 | 0 | Deskew Tune | Start |
| | | 1 | | Stop |
| 0001 | 110 | 0 | Link Exercise | Start |
| | | 1 | | Stop |
| 0001 | 111 | 0 | Reserved | Start |
| | | 1 | | Stop |

FIG. 10B

LINK CONTROL MESSAGES 764

| Code | Description | | |
|---|---|---|---|
| ----- | I am X; you are who/slave/me/master. | | |
| 0 x x x x | changing lower nibble value | xxxx = don't care. | |
| 001 1 d d d d | lower nibble (dddd) valid | Nibble Number | Value of dddd |
| | | 1 | device_id[63:60] |
| | | 2 | device_id[59:56] |
| | | 3 | device_id[55:52] |
| | | 4 | device_id[51:48] |
| | | 5 | device_id[47:44] |
| | | 6 | device_id[43:40] |
| | | 7 | device_id[39:36] |
| | | 8 | device_id[35:32] |
| | | 9 | device_id[31:28] |
| | | 10 | device_id[27:24] |
| | | 11 | device_id[23:20] |
| | | 12 | device_id[19:16] |
| | | 13 | device_id[15:12] |
| | | 14 | device_id[11:08] |
| | | 15 | device_id[07:04] |
| | | 16 | device_id[03:00] |
| | | 17 | port_num[5:2] |
| | | 18 | port_num[1:0], relationship[1:0] |
| | | Code | Relationship |
| | | 00 | Unknown |
| | | 01 | I am slave. |
| | | 10 | I am master. |
| | | 11 | I am you. |

FIG. 10C

LINK CONTROL MESSAGES  ← 765

| Code | | | Description | | |
|---|---|---|---|---|---|
| ----- | | | Continuous Status Messages (continued on next page) | | |
| 000000 | | | Null | | |
| 0001xx | | | Reserved | | |
| 01 | 001 | 0xx | DC Level Test | No pattern | |
| | | 00 | | ZERO Level | Fail |
| | | 01 | | | Pass |
| | | 10 | | ONE Level | Fail |
| | | 11 | | | Pass |
| | 010 | 0xx | Incoming Clock Check | Not present/invalid | |
| | | 00 | | Clock okay | Frequency = $f_0/2$ |
| | | 01 | | | Frequency = $f_0/4$ |
| | | 10 | | | Frequency = $f_0/8$ |
| | | 11 | | | Frequency = $f_0/16$ |
| | 011 | 0xx | Phase Tuning | No pattern | |
| | | 00 | | In progress | |
| | | 01 | | Done | |
| | | 10 | | Reserved | |
| | | 11 | | Reserved | |

FIG. 10D

LINK CONTROL MESSAGES — 767

| Code | | Description | | |
|---|---|---|---|---|
| ----- | | Continuous Status Messages (continued from previous page) | | |
| 100 | 0xx | AC Pulse Test | No pattern | |
| | 00 | | ZERO Pulse | Waiting for pulse |
| | 01 | | | Detected pulse |
| | 10 | | ONE Pulse | Waiting for pulse |
| | 11 | | | Detected pulse |
| 101 | 0xx | Deskew Tuning | No pattern | |
| | 00 | | In progress | |
| | 01 | | Done | |
| | 10 | | Reserved | |
| | 11 | | Reserved | |
| 110 | 0xx | Link Exercise | No pattern | |
| | 00 | | No incoming test pattern | |
| | 01 | | | |
| | 10 | | ptrn being rcvd | No errors |
| | 11 | | | Errors detected |
| 111 | 0xx | Reserved | | |
| | 00 | | | |
| | 01 | | | |
| | 10 | | | |
| | 11 | | | |
| 10000000 ↓ 11111110 | | Reserved | | |
| 11111111 | | Deskew Tuning Pattern | | |

FIG. 10E

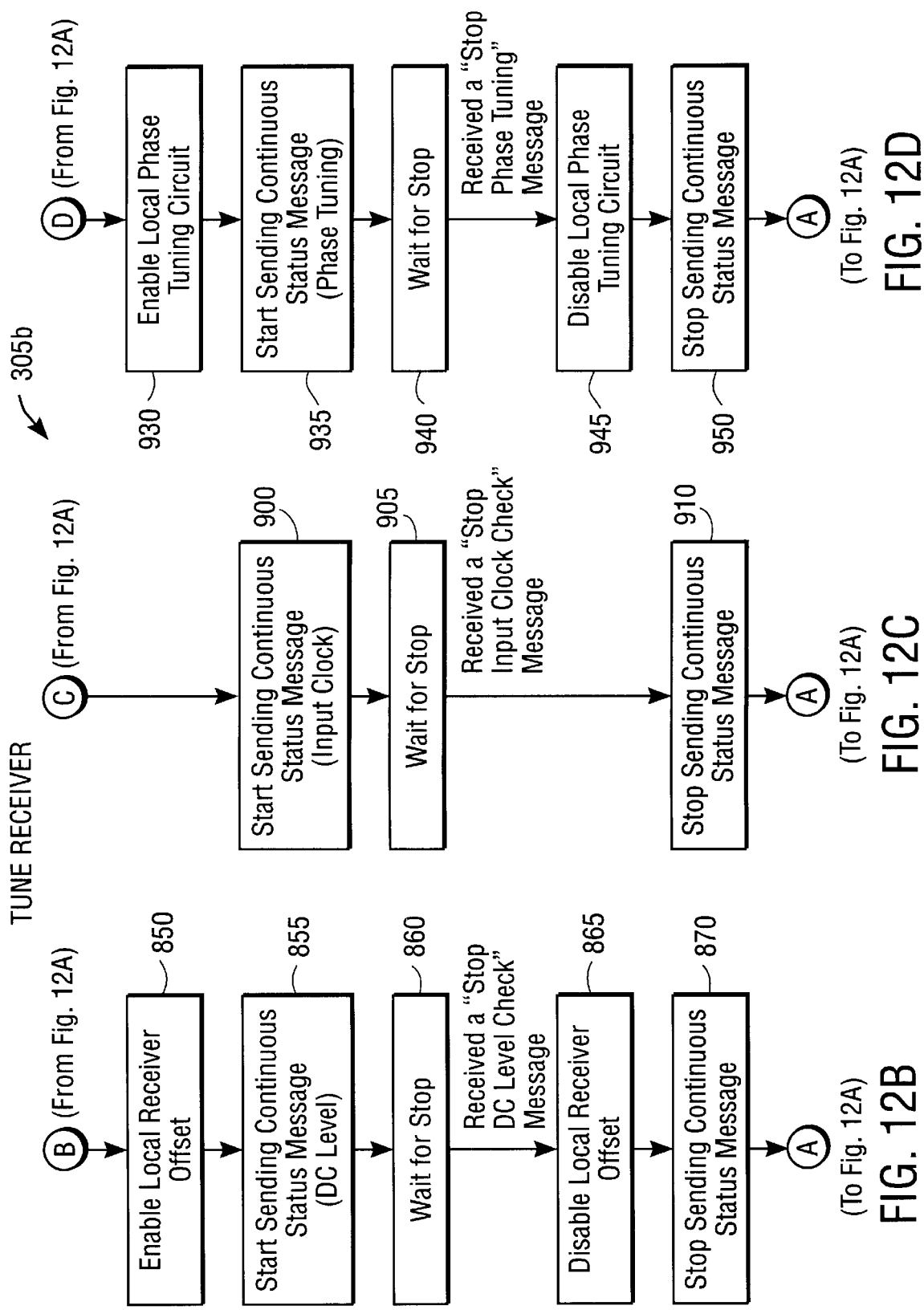

AUTOMATIC INITIALIZATION AND TUNING ACROSS A HIGH SPEED, PLESIOCHRONOUS, PARALLEL LINK

CROSS-REFERENCE TO RELATED APPLICATION

The subject matter of this application is related to the subject matter of co-pending U.S. patent application Ser. No. 09/249,935 filed on Feb. 12, 1999, by Yoichi Koyanagi, et al., entitled "SYSTEM AND METHOD FOR AUTOMATIC DESKEW ACROSS A HIGH SPEED, PARALLEL INTERCONNECTION" and is fully incorporated herein by reference. The subject matter of this application is also related to the subject matter of co-pending U.S. patent application Ser. No. 09/249,490, filed on Feb. 12, 1999, by Weixin Gai, entitled "SUPPLY NOISE IMMMUNITY LOW-JITTER VOLTAGE-CONTROLLED OSCILLATOR DESIGN" and is fully incorporated herein by reference.

FIELD OF THE INVENTION

The present invention relates generally to network systems, and more particularly to an apparatus and method for automatically initializing, tuning, and testing a plesiochronous, parallel link to achieve improved link performance.

BACKGROUND OF THE INVENTION

Links (i.e., interconnects) are used for transmitting data between routers in a network. Components that are used for forming links include, for example, integrated circuits, packaging for integrated circuits, printed circuit boards, connectors, cables, drivers, receivers, and other components. The characteristics and dimensions of link components vary, and as a result, can affect link performance. These variations may be due to the variations inherent in manufacturing processes. Acceptable components typically have variations that fall within rigidly-set manufacturing tolerances. Components that fall beyond the predetermined manufacturing tolerances are discarded.

As one example, a printed circuit board may be used as part of a link. The characteristics of the link are affected by the lengths/shapes of the traces on the printed circuit board, the quality of the board, and other factors that are influenced by the variations in manufacturing processes. Thus, the performance of different links may vary, since the characteristics of different circuit boards may vary.

The characteristics of link components may also vary based upon the particular network implementation or design. For example, longer-length links (in a particular implementation) require more power to drive signals across the links.

Additionally, the skew of the signal arrival time (at a receiving end of the link) for parallel signals increases as link components vary in length and/or characteristics. Typically, the skew is greater for longer-length parallel conductors than for shorter-length parallel conductors. As a result of greater skew, the signals along the parallel conductors will have different arrival times at the receiving end of the parallel conductors.

Accordingly, it is desirable to provide a method and apparatus that automatically compensates for the different component characteristics that are due to variations in the manufacturing processes and/or particular design implementations. It is further desirable to provide a method and apparatus that maximizes signal transmission across a link, while minimizing the power level that is required for signal transmission. It is further desirable to provide a method and apparatus that sets appropriate operating margins in the link to achieve sustained and reliable operation across the link. It is further desirable to provide an apparatus and method that compensates for variations in the manufacturing processes, thereby leading to a reduction in the number of components that are discarded due to rigidly-set manufacturing tolerances.

SUMMARY OF THE INVENTION

The present invention provides an apparatus for automatically initializing and tuning a link in a network system. The link is used for coupling one router to another router and may be implemented as a high speed, plesiochronous, parallel link. The apparatus in accordance with the present invention comprises a first link control unit coupled to a first end of the link; and a second link control unit coupled to a second end of the link and capable of communicating with the first link control unit to achieve automatic adjustment of at least some parameters of the link to improve performance of the link. According to an aspect of the present invention, the link control units are each state machines implemented in digital hardware.

The link control units communicate with each other to initialize, tune, and test the link. Communications between the link control units are performed in-band and at slow speed. Additionally, the link control units can communicate with each other even if the parameters of the drivers and receivers in the link are minimally tuned.

As a result of the tuning procedure performed in accordance with the present invention, data transmission can occur across the link at the fastest possible speed and at the lowest possible power level. In addition, the tuning procedure permits the setting of appropriate voltage margins in the receivers in the link to achieve sustained and reliable operations across the link. These voltage margins compensate for noise, power supply voltage variations, temperature variations, and/or other network environmental changes that may affect the timing and/or magnitude of signals that propagate across the link.

According to another aspect of the present invention, the following parameters are among the parameters that may be adjusted in a link:

(1) the terminator resistance on each end of the link;

(2) the DC current level of a driver circuit in the link wherein the DC current is used for maintaining a static signal on the link;

(3) the AC current level of a driver circuit in the link wherein the AC current enables the high-to-low or low-to-high transitions of a signal on the link;

(4) the transmission speed of a signal across the link;

(5) the phase relationship between a receiver clock and incoming data signals on each end of the link; and (6) the relative delay between individual data lines in the link, in order to reduce any skew between parallel data bits that arrive on each end of the link.

To determine the appropriate parameter settings for the link, known stimuli are transmitted across the link and are subsequently measured on both ends of the link. The known transmitted stimuli include reference voltages and conventional tuning patterns. The stimuli measurement methods include comparing the detected signal voltage levels with known voltage reference levels, comparing the timing of signal transitions with known reference timing signals, and comparing the received signal patterns on each end of the link with known reference patterns.

BRIEF DESCRIPTION OF THE DRAWINGS

FIG. 10A is a table listing the various codes that correspond to particular control signals in the tuning procedure in accordance with the present invention;

FIG. 10B is a table listing the various codes that correspond to particular control signals used for starting and ending each step in the tuning procedure in accordance with the present invention;

FIG. 10C is a table listing the various codes that correspond to particular control signals used for indicating the master-to-slave relationship in the tuning procedure in accordance with the present invention;

FIGS. 10D and 10E are tables that list the various codes that correspond to particular continuous status messages in accordance with the present invention;

FIGS. 12A–12G illustrate a flowchart that shows the functionality of the tune receiver in FIG. 2B;

DETAILED DESCRIPTION OF THE PREFERRED EMBODIMENTS

Figure 1:
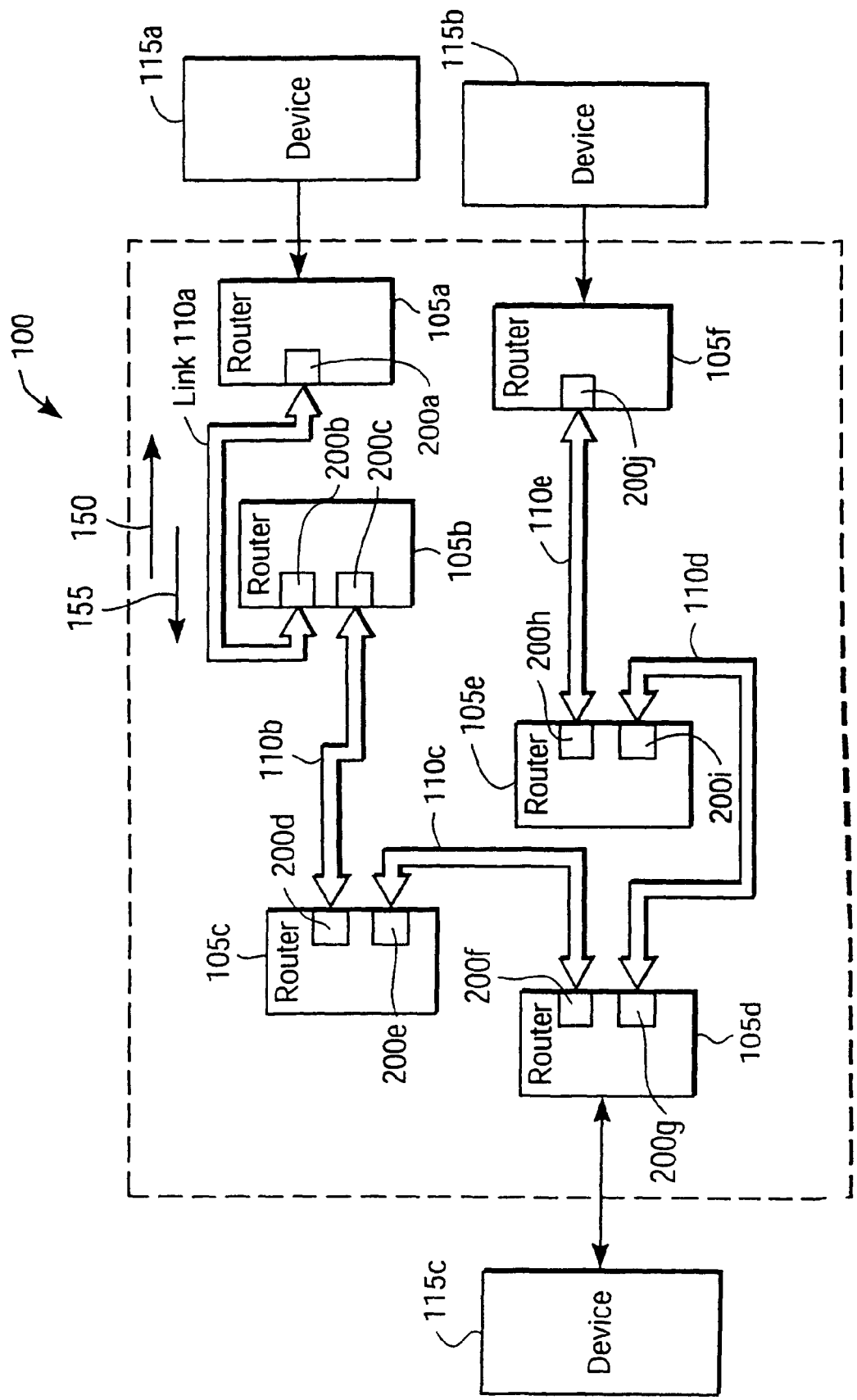
FIG. 1 is a functional block diagram of a network system that implements the automatic initialization and tuning system in accordance with the present invention.

Referring now to FIG. 1, there is shown an example of a network 100 that implements an automatic tuning and initialization system in accordance with the present invention. The network 100 includes a plurality of routers 105a–105f that can communicate with each other via links 110a–110e. In the example of FIG. 1, the router 105a communicates with the router 105b via link 110a, while the router 105b communicates with the router 105c via link 10b.

The links 110a–110e are each formed by drivers, receivers, wires that couple the drivers to the receivers, control objects, and other conventional elements used for data transmission. The links permit data to be transmitted between routers. The links 110a–110e may each be a high speed, plesiochronous, parallel link.

Conventional plesiochronous communication systems transmit signals with the same approximate frequency, but the signals are synchronized by different clocks. As a result, the signals have no phase relationships (i.e., the signals may or may not have a phase difference).

The network 100 further includes a plurality of devices 115a, 115b, and 115c, each representing computers, communication devices, or bridges to other types of links, to wide area networks (WANs) or to local area networks (LANs). In the example of FIG. 1, the devices 115a, 115b, and 115c are coupled to the routers 105a, 105f, and 105d, respectively. The number of routers, links, and devices in the network 100 may vary based upon design or user requirements.

A plurality of initialization and tuning systems (hereinafter "tuning systems") 200a–200j may be implemented in the routers 100a–100f, respectively, as shown in FIG. 1. Each of the tuning systems 200a–200j includes a link control unit (e.g., link control unit 205a in FIG. 2A) in accordance with the present invention. The tuning systems 200a–200j are used for automatically initializing and tuning the links 110a–110e. For example, the tuning systems 200a and 200b communicate with and provide feedback to each other in order to automatically initialize, tune and test the link 110a, as described in additional details below. Since the link 110a is tuned by the tuning systems 200a and 200b, link operation can be established at the fastest possible signal speed and at the lowest possible power level. As also described in additional details below, the tuning systems 200a and 200b set sufficient operating margins in the link 110a to permit sustained and reliable data transmission across the link 110a during network operations.

The tuning system in accordance with the present invention may also be used to tune other links in the network 100. For example, tuning systems 200c and 200d communicate with and provide feedback to each other in order to tune the link 110b. The tuning systems 200e and 200f communicate with and provide feedback to each other in order to tune the link 110c, and so forth.

In accordance with the present invention, the number of routers in the network 100 may vary. As a result, the number of tuning systems in the network 100 may also vary.

Figure 2A:
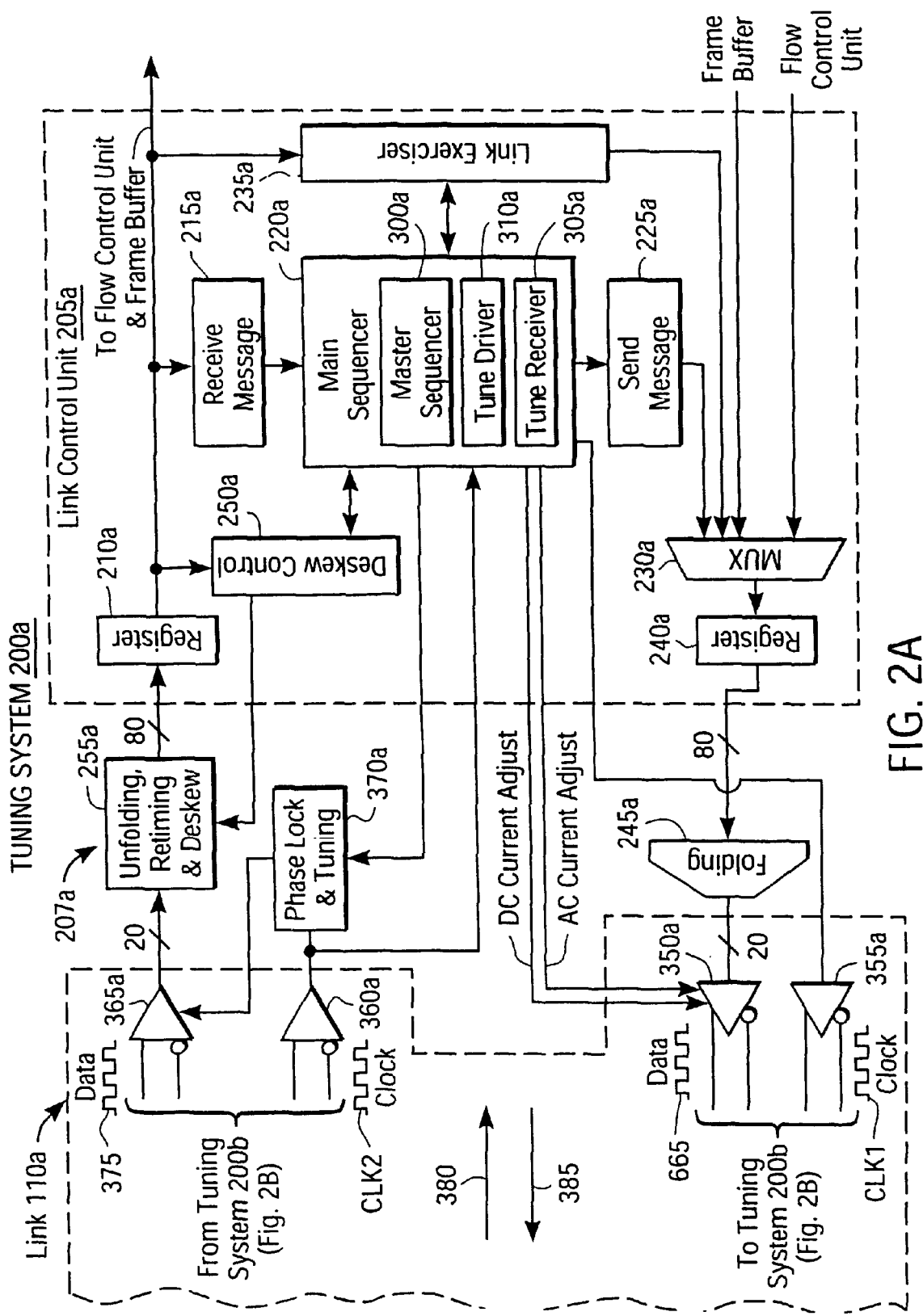
FIG. 2A is a functional block diagram of a tuning system in accordance with an embodiment of the present invention wherein a link control unit permits automatic tuning of a link that is coupled to the tuning system.
Figure 2B:
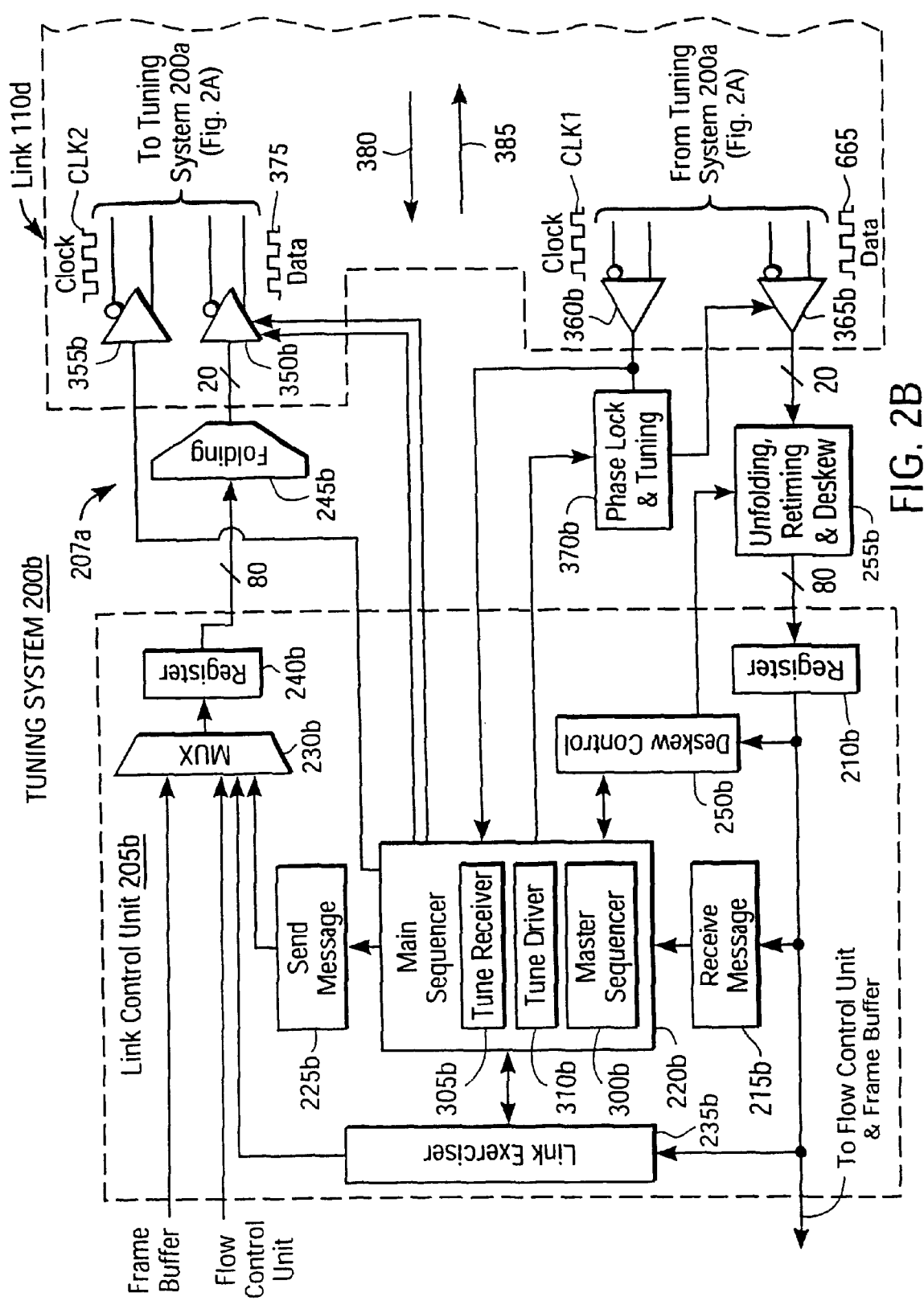
FIG. 2B is a functional block diagram of a tuning system in accordance with an embodiment of the present invention wherein, the tuning system communicates with the tuning system of FIG. 2A and permits the automatic tuning of the link between both tuning systems.

The functionality of the tuning system in accordance with the present invention is now discussed with particular reference to the tuning systems 200a and 200b in FIG. 2A and FIG. 2B, respectively. Referring initially to FIG. 2A, there is shown a functional block diagram of the tuning system 200a. The tuning system 200a comprises a link control unit 205a and interface components 207a. The link control unit 205a includes a register 210a for receiving signals that propagate along link 110a. A receive message module 215a buffers the messages sent by the tuning system 200b (FIG. 2B) wherein the messages serve as status signals or flags in the tuning procedure in accordance with the present invention. A main sequencer 220a receives the messages from the receive message module 215a and also sends messages (status signals), via send message module 225a, to the tuning system 200b (FIG. 2B) in order to perform the tuning procedure in accordance with the present invention. A multiplexer 230a receives data frames from any suitable frame buffer (not shown) and control signals from any suitable frame flow control unit (not shown). The multiplexer 230a also receives the test patterns generated by a link exerciser 235a and receives the messages to be sent by the main sequencer 220a to the link control unit 205b in tuning system 200b (FIG. 2B). A register 240a is used for buffering the output of the multiplexer 230a and has an output coupled to the link 110a via a folding circuit 245a. The output of the register 240a is an 80-bit signal which is received by the folding circuit 245a. In one embodiment according to the present invention, the folding circuit 245a is a 4-to-1 multiplexer that will fold an 80-bit input into a 20-bit output and is capable of processing data having speed as high as about 1.25 gigabytes per second.

A deskew controller 250a also receives commands from the main sequencer 220a and is used to control a retiming/deskew circuit 255a for unfolding, retiming, and reducing skew of data transmitting along link 110a. One suitable retiming/deskew circuit 255a is disclosed in the above-referenced commonly-assigned, co-pending U.S. Patent Application by Yoichi Koyanagi, et al., entitled "SYSTEM AND METHOD FOR AUTOMATIC DESKEW ACROSS A HIGH SPEED, PARALLEL INTERCONNECTION" and fully incorporated herein by reference.

As further shown in FIG. 2A, the main sequencer 220a includes a master sequencer 300a, a tune receiver 305a, and a tune driver 310a, all of which are used in the tuning procedure in accordance with the present invention, as described below.

The main sequencer 220a, receive message stage 215a, and send message stage 225a may each be state machines implemented in digital hardware. The link exerciser 235a may be a conventional test pattern generator and checker. For example, the link exerciser 235a may be implemented by a conventional linear feedback, shift register pseudo-random test pattern generator and checker.

The link control unit 205a can adjust particular operating parameters of drivers 350a and 355a and receivers 360a and 365a (of link 110a) in order to compensate for material and dimensional characteristics that vary for each particular link. These characteristics are due to the variations in manufacturing processes. By compensating for the different link characteristics, the link permits signal transmission at the fastest possible speed and at the lowest possible power level. As discussed below in additional detail, sufficient operating margins are also established, thereby leading to sustained and reliable data transmission across the link 110a. This operating or safety margin compensates for noises, power supply voltage variations or changes, temperature changes, or other network environmental changes that may affect the timing or amplitude of signals that propagate across the links.

The interface components 207a permit the link control unit 205a to communicate with the link 110a. The interface components 207a includes the folding circuit 245a, the retiming/deskew circuit 255a, and a phase lock/tuning circuit 370a for tuning the phase of a received clock CLK2 for recovering data 375 that is received by the receiver 365a. The data 375 is received (via link 110a) from the router 105b (FIG. 1). Any suitable phase lock/tuning circuit may be used for tuning the phase of the received clock CLK2. The above-mentioned U.S. patent application entitled "SUPPLY NOISE IMMMUNITY LOW-JITTER VOLTAGE-CONTROLLED OSCILLATOR DESIGN," by Weixin Gai also discloses a suitable phase/lock tuning circuit.

Note that in FIG. 2A, the link driver 350a and link receiver 365a are each shown as single units for purposes of describing the functionality of the present invention. In accordance with the present invention, the link driver 350a is typically formed by multiple link driver circuits for transmitting data to a receiver 365b (FIG. 2B), while the link receiver 365a is typically formed by multiple link receiver circuits for receiving data from a driver 350b (FIG. 2B).

The components of the tuning system 200b in FIG. 2B are similar to the components of tuning system 200a in FIG. 2A. The operation of tuning systems 200a and 200b during the tuning procedure in accordance with the present invention is described below in the flowchart shown in FIGS. 3 to 4 and in the state diagram shown in FIG. 7.

Figure 3:
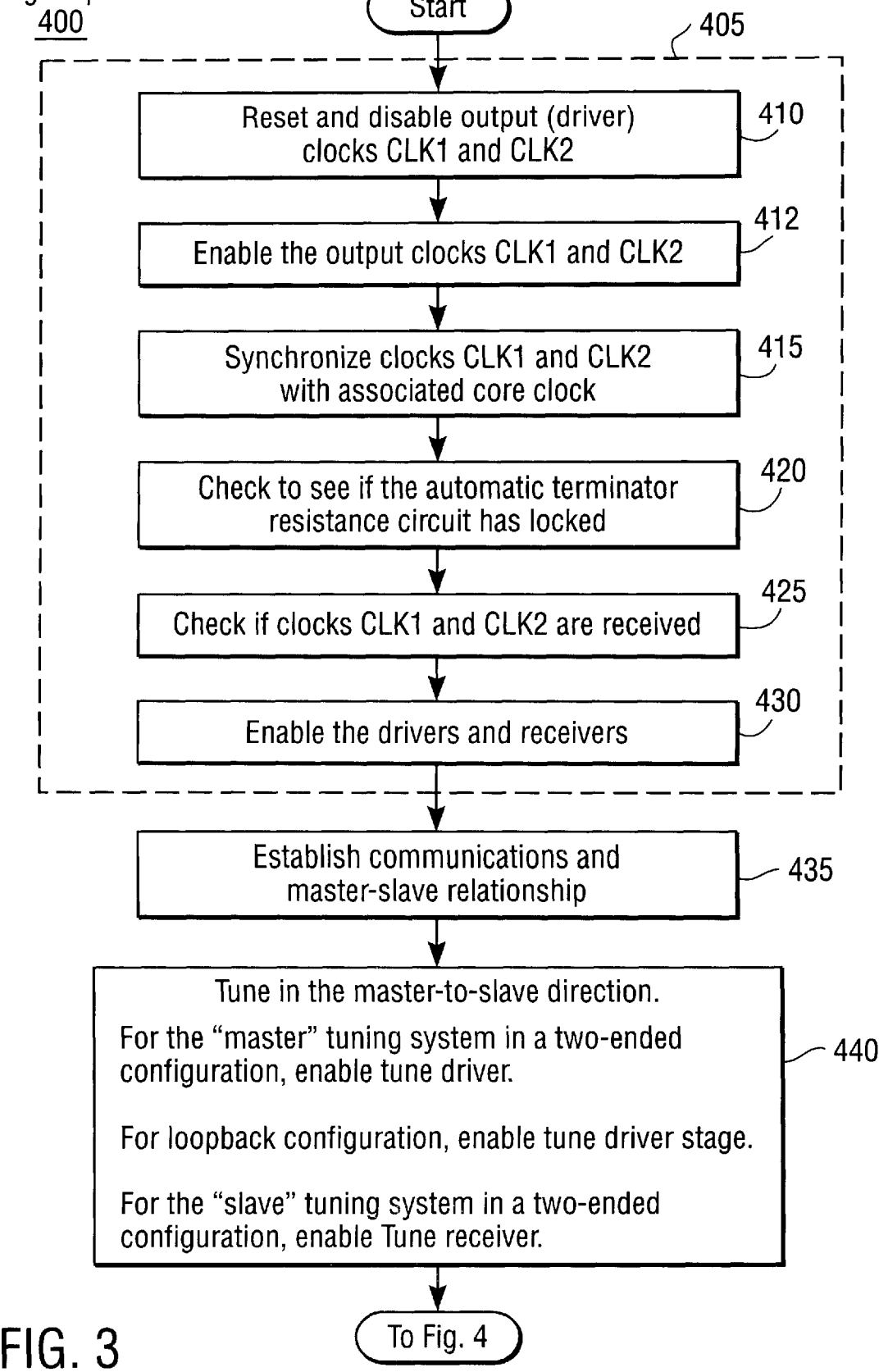
FIGS. 3 and 4 illustrate a flowchart that shows the initialization and tuning of a link in a network, in accordance with the present invention.
Figure 4:
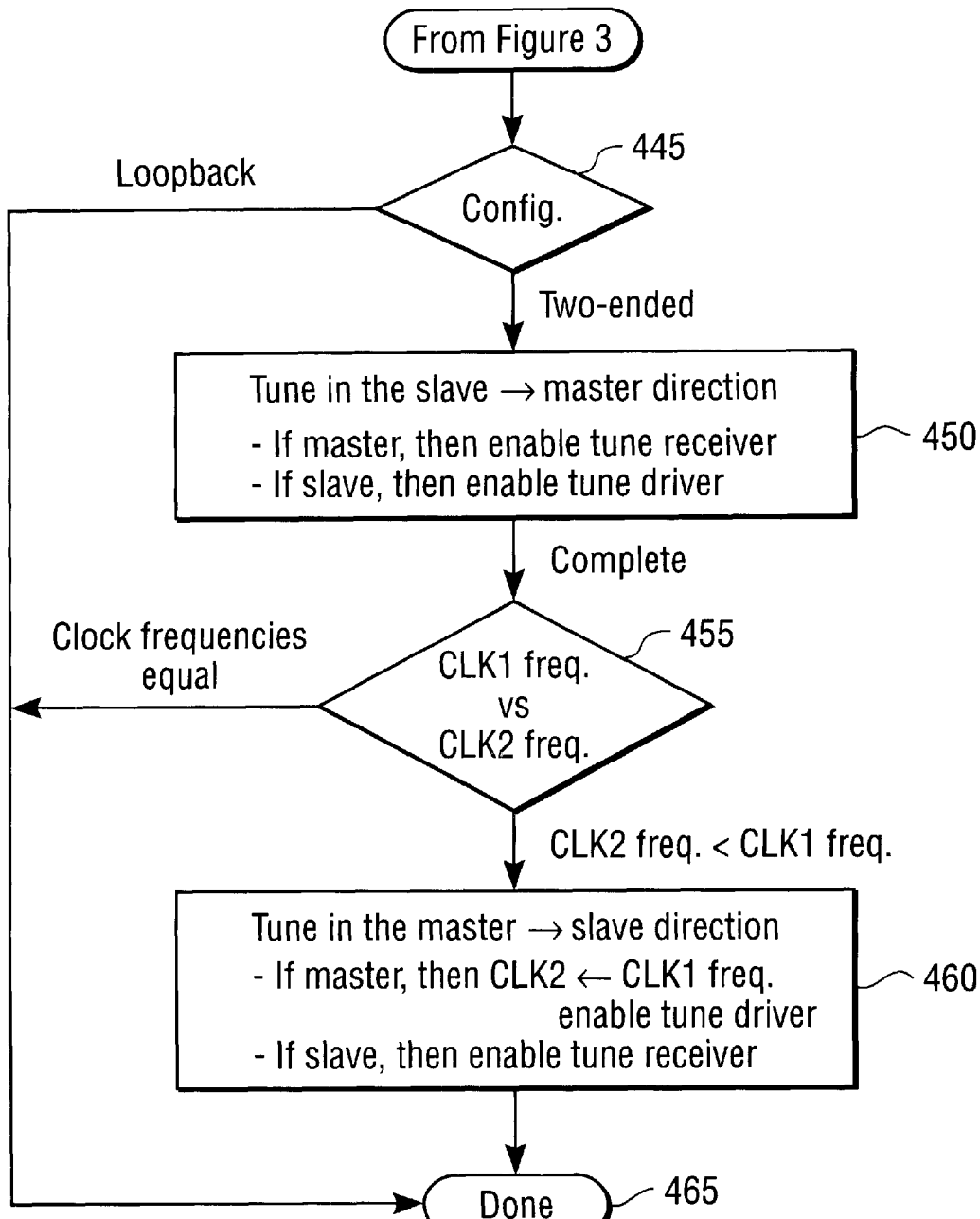

FIGS. 3 to 4 illustrate a flowchart that shows an initialization and tuning sequence 400 in accordance with the present invention. The tuning of link 110a (between routers 105a and 105b) in FIG. 1 will be used as an example for purposes of discussing the initialization and tuning sequence 400 in FIGS. 3 to 4. The tuning systems 200a and 200b (FIGS. 2A–2B) in routers 105a and 105b, respectively, are used in the initialization and tuning sequence 400. In particular, the initialization and tuning sequence 400 is performed under the controls of master sequencer 300a (FIG. 2A) and master sequencer 300b (FIG. 2B). The same initialization and tuning sequence 400 is also used for tuning other routers in FIG. 1.

The sequence 400 begins with an initialization procedure 405. In the initialization procedure 405, the link control units 205a and 205b (FIGS. 2A and 2B, respectively) are reset 410 (FIG. 3). An event that triggers the start of the link initialization and tuning sequence 400 may only be seen by one end of a link. Such an event may, for example, be a router hardware reset or a link error occurrence. At the start of the sequence 400, a link control unit (e.g., unit 205a) disables the transmission clock CLK1 (which is the receive clock for the tuning system 200b at the opposite end of the link 110a). The loss of the receive clock forces the link control unit 205b (of tuning system 200b) to also re-start the initialization and tuning sequence 400. As a result, both link control units 205a and 205b (FIGS. 2A and 2B, respectively) become synchronized in starting initialization and tuning procedure 400.

When reset 410 is performed, the clock signals "CLK1" and "CLK2" (provided by clock drivers 355a and 355b in FIGS. 2A and 2B, respectively) are disabled, since simultaneous assertion of reset 410 and the clocks CLK1 and CLK2 may cause particular conventional latches (not shown) in the link 110a to exhibit "unfriendly" or undesired behavior. The clocks CLK1 and CLK2 are used for clocking the output data from drivers 350a and 350b, respectively.

The master sequencers 220a and 220b (FIGS. 2A and 2B, respectively) then enable 412 the output clocks CLK1 and CLK2, respectively, by enabling the clock drivers 355a and 355b. According to one embodiment in accordance with the invention, the clocks CLK1 and CLK2 are then synchronized (phase aligned) 415 with the core clock which is generated by an associated on-chip phase lock loop (PLL) clock output. A PLL is typically implemented in each of the phase lock/tuning circuits 370a (FIG. 2A) and 370b (FIG. 2B).

Figure 5:
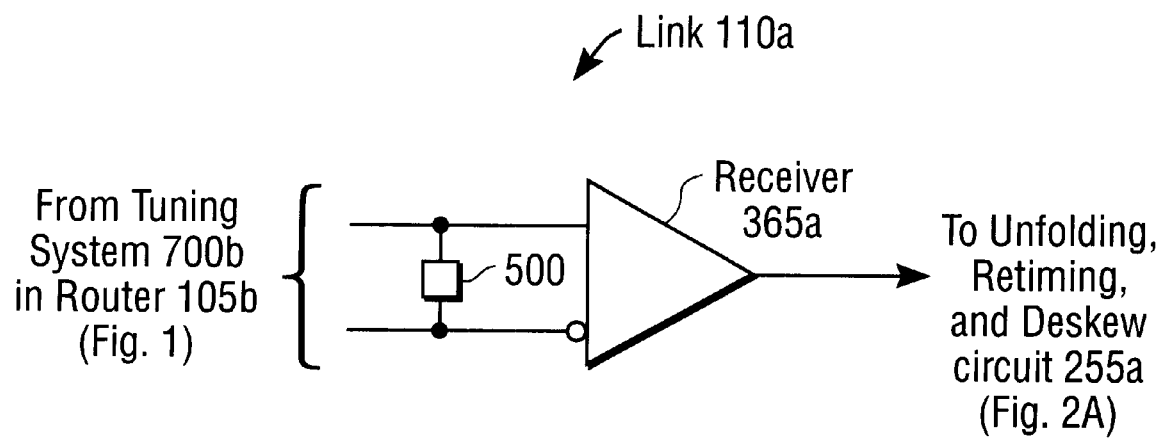
FIG. 5 is a block diagram of a link receiver coupled to an adjustable terminator resistance circuit.

Each of the links 110a–110e (FIG. 1) has an automatic on-chip terminator resistance circuit at each end of each link. For example, in FIG. 5 an on-chip terminator resistance circuit 500 is shown as being coupled to the inputs of receiver 365a of link 110a. The on-chip terminator resistance circuit 500 has a resistance value that is adjustable in order to compensate for process and/or temperature variations, and may be implemented with conventional parallel transmission gates. The resistance value of the on-chip terminator resistance circuit 500 is controlled by selectively turning on particular gates. The resistance value of the on-chip terminator resistance circuit 500 is compared with an external 50-ohm precision reference resistor (not shown). When the appropriate resistor value is determined in order to compensate for process and/or temperature variations, the on-chip terminator resistance circuit 500 locks at the appropriate resistor value. The resistor value is determined by comparing the resistance of a replica of the terminator resistor (and associated drivers/receivers) with a conventional external precision resistor circuit (not shown), in accordance with any suitable conventional methods. The terminator resistance circuit 500 will lock when the resistance value of the terminator resistance circuit 500 reaches a value approximate to the value of the external precision resistor circuit. The main sequencer 220a (FIG. 2A) checks 420 (FIG. 3) to determining if the on-chip terminator resistance circuit 500 has locked. The main sequencer 220a receives a status signal sent by the resistance circuit 500 indicating that the resistance circuit 500 has locked.

The initialization procedure 405 in FIG. 3 then proceeds by checking 425 if the clock receivers 360a and 360b (FIGS. 2A and 2B, respectively) receive the clocks CLK2 and CLK1, respectively. If the clock CLK2 is detected, then the tuning system 200b (FIG. 2B) is presumed to be operational. If the clock CLK1 is detected, then the tuning system 200a (FIG. 2A) is presumed to be operational. If neither clocks CLK1 nor CLK2 are detected, then the initialization procedure 405 is again repeated in the same manner as shown in FIG. 3. If the clocks CLK1 and CLK2 are detected, the drivers 350a and 350b (and receivers 360a and 360b) are enabled 430 (FIG. 3).

Communication is then established 435 between tuning systems 200a and 200b (via link control units 205a and 205b). Additionally, a master-to-slave relationship between link control units 205a and 205b is determined based on the following procedure. Each link control unit in the tuning systems 200a–200f (FIG. 1) has a unique associated identifier that includes a chip identification number and a network port number. Thus, the link control unit 205a (FIG. 2A) has a unique associated identifier including an associated chip identification number and an associated network port number. The link control unit 205b (FIG. 2B) also has a unique associated identifier including an associated chip identification number and an associated network port number. The master-to-slave relationship between the link control units 205a and 205b is determined based upon the values of their associated identifiers. Thus, if the identification number of link control unit 205a is greater than the identification number of link control unit 205b, then the link control unit 205a is deemed as the master and the link control unit 205b is deemed as the slave.

The tuning 440 of the drivers and receivers in link 110a is then performed. As described in further details below, the tuning procedure determines the maximum possible frequency in which the link can operate. The tuning procedure also determines the lowest possible value for the driver currents in the link, thereby optimizing the power consumption of the link. The tuning procedure determines the maximum possible operating frequency and lowest possible driver current levels in both the direction 150 and the direction 155 (see FIG. 1). As also described in additional detail below, the tuning procedure sets an operating voltage margin for each of the receivers 365a and 365b (FIGS. 2A and 2B) in order to insure sustained and reliable network operation.

Assuming that the link control unit 205a (FIG. 2A) is deemed as the "master" and the link control unit 205b (FIG. 2B) is deemed as the "slave", tuning is first performed in the master-to-slave direction 380 (FIGS. 2A and 2B) in link 110a. Tuning is then performed in the slave-to-master direction 385 (FIGS. 2A and 2B) in link 110a.

Figure 6:
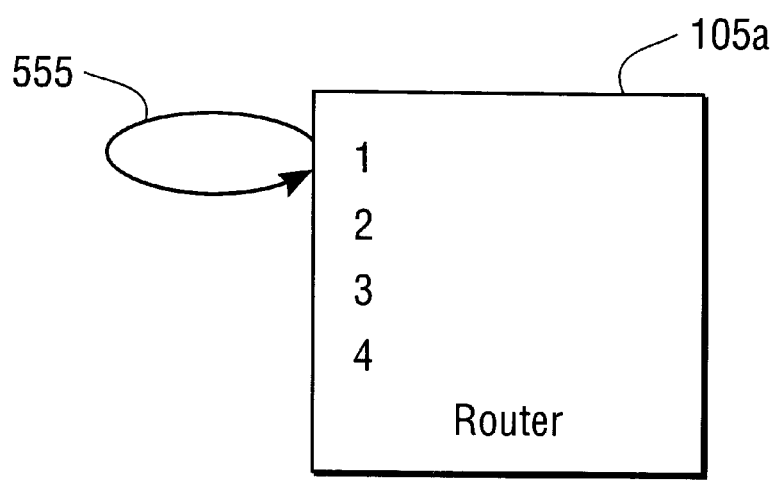
FIG. 6 is a block diagram of a router having a loopback configuration.

If a loopback configuration exists (see reference arrow 555 in FIG. 6) for the router 105a (on the master side), then the tune driver 310a (FIG. 2A) is enabled to begin the tuning procedure in accordance with the present invention. If a two-ended configuration exists (i.e., the router 105a is coupled to the router 105b), then the tune driver 310a (FIG. 2A) is enabled to begin the tuning procedure. For the two-ended configuration, the tune receiver 305b (on the slave side) is also enabled so that the link control unit 205b (FIG. 2B) can communicate with the link control unit 205a during the tuning procedure.

Referring now to FIG. 4, the following steps in the initialization and tuning sequence 400 depend on the configuration 445 of the router. Thus, if a loopback configuration exists for router 105a (on the master side), then the initialization and tuning sequence 400 between link control unit 205a and itself terminates 465 after performing the tuning 440 in the master-to-slave direction 380 in link 110a. If, however, the two-ended (normal) configuration exists between routers 105a and 105b, then tuning 450 is subsequently performed in the slave-to-master direction 385 (FIGS. 2A and 2B) in link 110a. The tune receiver 305a (on the master side) and the tune driver 310b (on the slave side) are both enabled to permit the link control units 205a and 205b to communicate with each other during the tuning step 450.

The frequencies of the clocks CLK1 and CLK2 are then compared 455. If the frequency values of the clocks CLK1 and CLK2 are equal, then initialization and tuning procedure 400 terminates 465 with respect to routers 105a and 105b. If, however, the frequency of the clock CLK2 (received by clock receiver 360a) is less than the frequency of the clock CLK1 (generated by clock driver 355a), then tuning 460 is again performed in the master-to-slave direction 380 in link 110a to make the values of the clocks CLK1 and CLK2 equal. During the tuning step 460, the tune driver 310a (on the master side) and the tune receiver 305b (on the slave side) are again enabled to permit the link control units 205a and 205b to communicate with each other. According to one embodiment of the present invention, during the tuning step 460 the frequency of the clock CLK1 is reduced until the frequency values of clocks CLK1 and CLK2 are equal. The initialization and tuning sequence 400 then ends 465, and the above initialization and tuning sequence is then performed with respect to other tuning systems FIG. 1 (e.g., tuning systems 200c communicates with tuning system 200d to tune link 110b).

According to the present invention, the initialization and tuning sequence 400 is re-started if either the tune receiver 305a or tune receiver 305b fails. The sequence 400 is also re-started if the tune driver 310a or tune driver 310b fails. The initialization and tuning sequence 400 is also re-started if timeout occurs. Each major sequence 400 in accordance with the present invention includes initialization, establishing communications between the link control units, tuning in the master-to-slave direction and tuning in the slave-to-master direction (for two-ended configurations). This major sequence 400 is designed to be completed within some bounded amount of time. If a particular major sequence 400 fails to be completed within the bounded amount of time (i.e., timeout has occurred), then the major sequence 400 is restarted.

Figure 7:
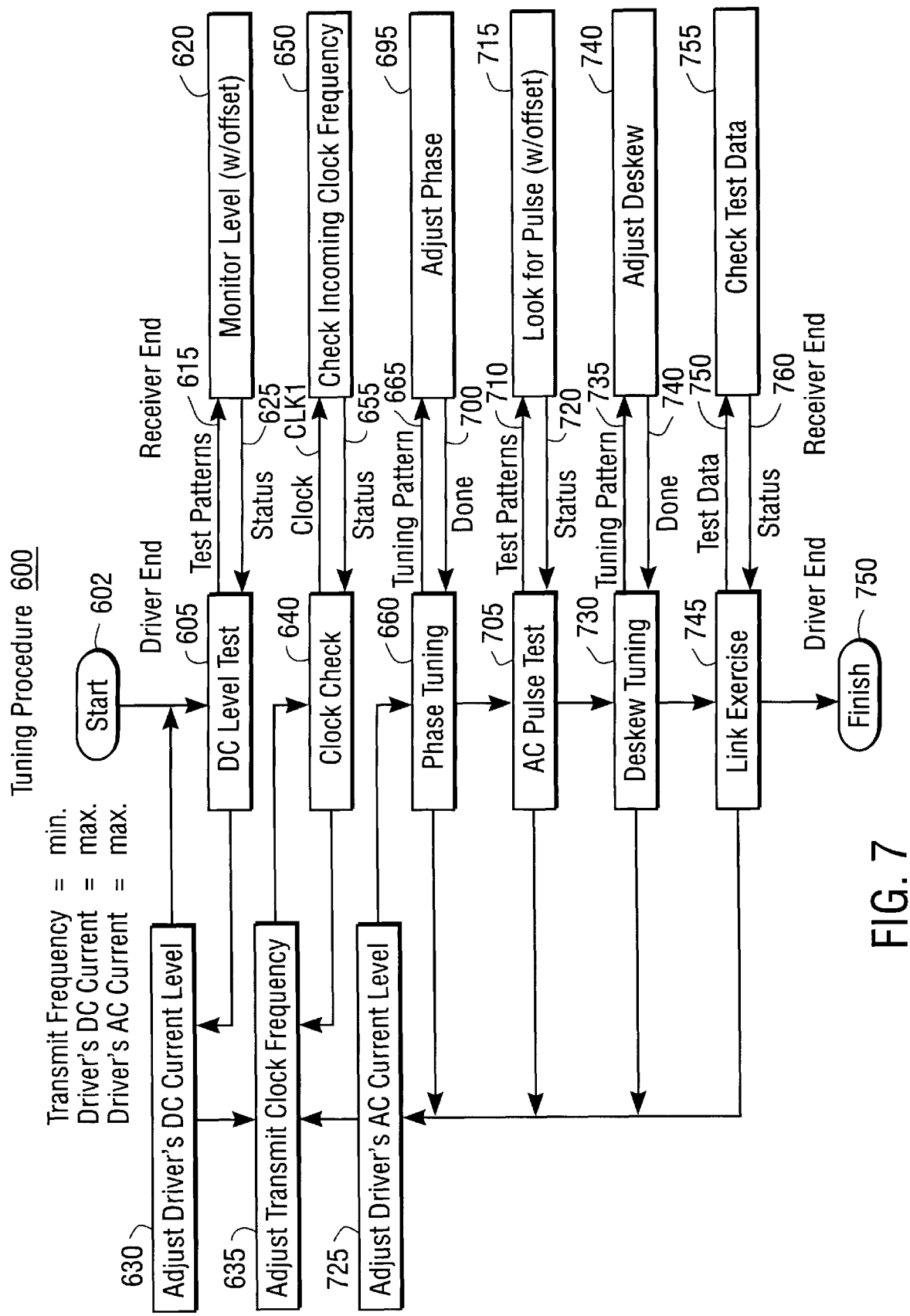
FIG. 7 is a state diagram that shows the tuning of a link in a network, in accordance with the present invention.

Reference is now made to FIGS. 2A–2B and 7 in order to discuss the tuning procedure for a link in the network 100. The tuning systems 200a and 200b and link 100a are again used as examples for discussing a tuning procedure in accordance with the present invention. FIG. 7 is a state diagram that illustrates a tuning procedure 600 in accordance with the present invention. The tuning procedure 600 illustrated in FIG. 7 is performed in step 440 and/or step 450 (and in step 460 for tuning the clock CLK1 frequency) in the initialization and tuning sequence 400 of FIGS. 3 to 4. For purposes of explaining the functionality of the present invention, it is assumed that the tuning procedure 600 is performed in the master-to-slave direction 380 (FIG. 2A) in link 110a. However, the tuning procedure 600 is also performed in the slave-to-master direction 385 (FIG. 2A). Additionally, the tuning procedure 600 is used by the other initialization and tuning systems illustrated in FIG. 1. After the tuning procedure 600 is started 602 and before each test (e.g., DC level test 605) in the tuning procedure 600, the link control unit 205a (on the master side) sends a particular start test signal (see Table 762 in FIG. 10B) to the link control unit 205b (on the slave side) to signal a start of a particular test in tuning procedure 600. After completion of each test in the tuning procedure 600, the link control unit 205a sends a particular stop test signal (see Table 762 in FIG. 10B) to the link control unit 205b to signal an end of the particular test in tuning procedure 600.

Referring again to FIG. 7, the DC level test 605 is performed so that the driver 350a (FIG. 2A) generates a voltage output of a sufficient magnitude that is detectable by receiver 365b (FIG. 2B) on the slave side. The link control units 205a and 205b communicate with each other in order to properly adjust the output voltage (or DC current level) of the driver 350a so that the receiver 365a receives a voltage of a detectable magnitude. As an example, if the link 110a has an equivalent resistance of fifty (50) ohms wherein the resistance of the link 100a may vary due to process and design variations, then the link control unit 205a automatically sets the driver 350a (FIG. 2A) output at a particular voltage so that the receiver 365b receives a signal of at least 50 millivolts. The driver 350a output is adjusted to an appropriate magnitude in response to feedback from the link control unit 205b. Thus, the DC level test 605 compensates for link signal attenuation due to resistive losses and signal dispersion.

Process variations may also cause differences in the output capabilities of the CMOS elements in driver 350a (FIG. 2A). The link control unit 205a and 205b can communicate with each other so that the link control unit 205a can adjust the driver 350a output voltage based upon the output capabilities of the CMOS elements in the driver 350a. This ability to adjust the driver 350a output voltage (based upon the output capabilities of the CMOS elements) permits the present invention to advantageously optimize the power consumption along link 110a.

The DC level test 605 (FIG. 7) is performed as follows. The send message module 225a in link control unit 205a (FIG. 2A) generates the test patterns 615 (FIG. 7) that are received by receiver 365b (FIG. 2B). According to one embodiment of the present invention, the initial test patterns 615 are set at the maximum voltage amplitude. The pattern may be a stack of ones and zeros on one data line (e.g., 1111111111111 or 0000000000000000). It is noted further that the send message module 225a (FIG. 2A) also generates the test patterns 665, 710, and 735 used in the tuning procedure 600 in FIG. 7.

Additionally, a voltage offset in receiver 365b (FIG. 2B) may be enabled to ensure a proper operating margin along link 110a. Thus, the driver 350a (FIG. 2A) is required to generate an output that overcomes the voltage offset in receiver 365b. The voltage offset advantageously compensates for any temperature or other variations that occur during the operation of the network 100 (FIG. 1).

The link control unit 205b (FIG. 2B) monitors 620 the receiver 365b to determine if the receiver 365b is able to detect the test patterns 615 sent by driver 350a. The link control unit 250b then sends status messages 625 (via driver 350b) to the link control unit 205a wherein the status signals 625 indicates if the receiver 365b has detected the test pattern 615 of a particular magnitude. According to one embodiment, the status messages 625 will indicate the patterns detected by the receiver 365b.

If the status messages 625 indicate that the receiver 365b is accurately detecting the test patterns 615, then the link control unit 205a will adjust 630 the DC current level of the driver 350a output, thereby adjusting the voltage level of test patterns 615. A test pattern 615 with the lower voltage level is then transmitted by the driver 350a to the receiver 365b, and the link control unit 205b will indicate, via the status messages 625, if the test patterns 615 have been accurately detected by receiver 365b.

The DC current level may be decreased to about sixteen (16) different levels, wherein each level may have a value of approximately 1.0 milliampere if the link has an equivalent resistance of about 50 ohms. The DC current level of driver 350a is adjusted 630 by link control unit 205a (to decrease the voltage magnitude of test patterns 615) until the link control unit 205b indicates (via status message 625) that the receiver 365b is erroneously receiving or is unable to detect the test patterns 615. If the status signal 625 indicates an error, then the link control unit 205a will adjust 630 the DC current level of the driver 350a back to the previous level that was detectable by receiver 365b.

The tuning procedure 600 then proceeds by adjusting 635 the clock CLK1 generated by driver clock 355a to a maximum frequency "fmax" wherein fmax may have a value of, for example, about 625 megahertz. It is noted that after reset and prior to the start of the tuning procedure 600, the CLK1 clock frequency is preferably set at a minimum level (e.g., fmax/16). A clock check 640 is performed to determine the fastest possible frequency value in which the link 110a can operate in the master-to-slave direction 380. The link control unit 205a initially sets the CLK1 clock output of clock driver 355a to fmax, and the link control unit 205b determines 650 if the clock receiver 365b can accurately recover the clock CLK1 at the fmax value. The link control unit 205b informs the link control unit 205a (via status messages 655) if the clock receiver 360b can recover the clock CLK1.

If the status messages 655 indicate that the clock receiver 360b is unable to recover the clock CLK1 at the fmax value, then the link control unit 205a adjusts 635 the CLK1 clock frequency to a lower incremental value (e.g., fmax/2), and the clock CLK1 with the frequency fmax/2 is again transmitted across the link 110a. The link control unit 205b (FIG. 2B) informs the link control unit 205a (via status signals 655) if the clock CLK1 was recovered. The frequency of the clock CLK1 is adjusted 635 to lower values (e.g., fmax/4, fmax/8, fmax/16) until the link control unit 205b (FIG. 2B) indicates via status signals 655 that the clock CLK1 has been recovered by clock receiver 360b.

In a two-ended configuration, the status from the receiver end back to the driver end is included in the continuous status messages (e.g., status messages 655).

Figure 8:
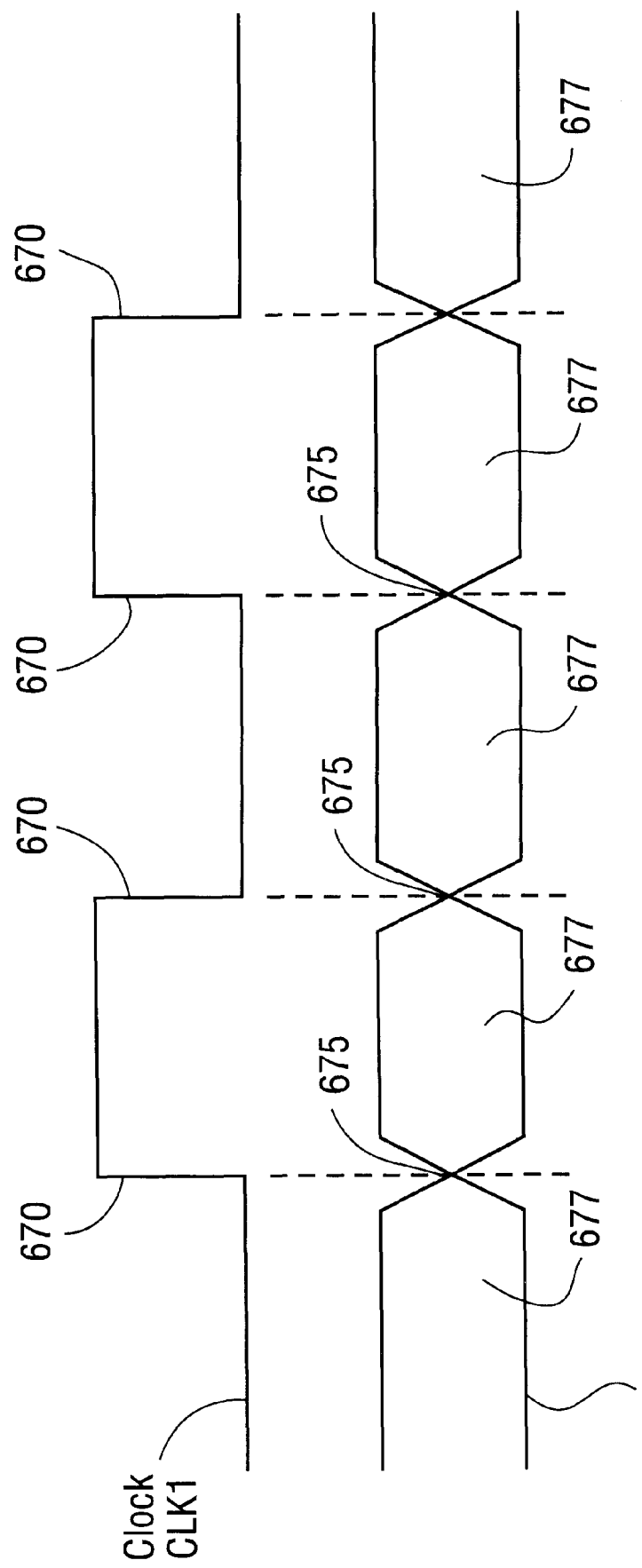
FIG. 8 is a timing diagram of a clock signal and a data signal propagating in a link prior to the phase tuning procedure in accordance with the present invention.
Figure 9:
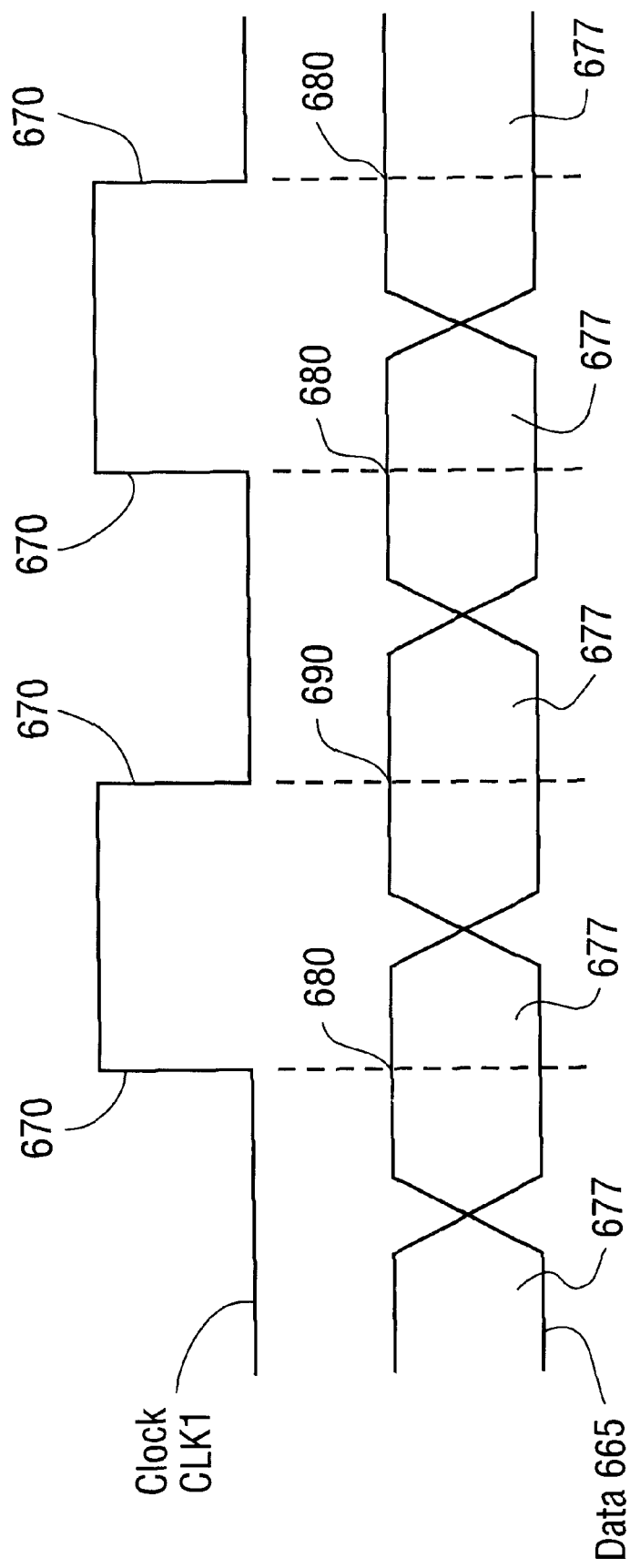
FIG. 9 is a timing diagram of the clock signal and the data signal in FIG. 8 after performing the phase tuning procedure in accordance with the present invention.

The tuning procedure 600 then performs a phase tuning procedure 660 in order to adjust the phase relationship between the clock CLK1 and test data 665 which is generated from send message module 225a (FIG. 2A) and received by receiver 365b (FIG. 2B). Phase tuning 660 permits the receiver 365b to capture the incoming data 665. Prior to phase tuning 660, the phase relationships between the data and the incoming clock CLK1 at the receiver end are unknown. Once phase tuning 660 is enabled and the phase tuning pattern 665 (i.e., 101010101010 . . . on each data line in link 110a) is applied, the phase tuning circuit 370b (FIG. 2B) aligns data transitions 675 (of each data cell or symbol 677) with clock transitions 670 (or vice versa) as shown in FIG. 8. As the phase tuning circuit 370b is disabled, the data 665 (or clock CLK1) is shifted approximately ninety (90) degrees out of phase with the clock CLK1 (or data 665) to achieve the phase relationship shown in FIG. 9. For example, an edge 670 of clock CLK1 is approximately aligned with an associated middle point 680 of a data cell 677. By aligning a clock edge 670 with an associated middle point 680 of a data cell 677, the incoming data 665 can be recovered by the receiver 365b.

According to one embodiment of the present invention, approximately twenty (20) data cells (symbols) 677 are aligned with a corresponding clock edge 670 before ending the phase tuning step 660. The phase of the clock CLK1 is adjusted 695 by the phase tuning circuit 370b (FIG. 2B) on the slave side of link 110a. After phase tuning 660 has been performed and approximately twenty (20) data cells have been aligned with an associated clock edge 670, the link control unit 205b (FIG. 2B) will send a status message 700 to the link control unit 205a to indicate that the phase tuning step 660 can be terminated. It is noted further that during the phase tuning 660, deskew tuning 730, and link exercise 745 steps, the sufficiency of the AC current level from the driver 350a output is implied through the success or failure of the tuning steps 660, 730, and 745. As stated in one example above, a sufficient AC current level may be at approximately fifty (50) millivolts.

An AC pulse test 705 is then performed in the tuning procedure 600 to determined the sufficiency of the AC current output of the driver 350a. The test patterns 710 includes both the zero-pulse pattern (e.g., 1111111011111111) and the one-pulse pattern (e.g., 0000000010000000). The link control unit 205b (FIG. 2B) can determine if the receiver 365b detects the test patterns 710 and sends back status signals 720 indicating if the receiver 365b has been able to accurately detect the test patterns 710. In addition, a voltage offset may be set at the receiver 365b to insure a proper operating margin to compensate for temperature variations and/or other variations that may occur during network operations.

If the receiver 365b is able to detect the tuning pattern 710, then the link control unit 205a will adjust 725 the AC current level (or voltage output) of the driver 350a output to the next lower level so that the voltage magnitude of test patterns 710 is decreased. The test patterns 710 are sent across the link 110a to the receiver 365b and the link control unit 205b will send back a status message 720 indicating if the receiver 365b is able to accurately detect the test patterns 710. The AC current level of the driver 350a output is adjusted 725 to the next lower level until the receiver 365b is unable to detect the incoming test patterns 710. When the status message 720 indicates that the receiver 365b can no longer detect the test patterns 710, the AC current level of the driver 350a output is increased to the previous level that is detectable by the receiver 365b.

As also shown in FIG. 7, whenever the AC current level of the driver 350a is adjusted 725, the phase tuning step 660 and subsequent steps are repeated.

Deskew tuning 730 is then performed in the tuning procedure 600. Deskew tuning 730 allows the receiver 365b (FIG. 2B) to compensate for differences in the wire delays among the parallel wires in the link 110a, wherein the difference in wire delay is due in part to process variations and/or different wire lengths. The deskew tuning procedure 730 may also frame the words in data 665 for proper alignment.

Deskew tuning 730 is initiated when the link control unit 205a informs the link control unit 205b to begin the deskew tuning procedure. The link control unit 205b will enable the retiming/deskew circuit 255b (on the slave side) to eliminate the skew between parallel data bits of incoming data 665. The deskew function aligns the parallel data bits in a symbol and aligns symbols within a word. The link control unit 205b will then indicate (via status message 740) to the link control unit 205a when the deskew function can be terminated.

A link exercise 745 is then performed in the tuning procedure 600. Conventionally known pseudo-random test patterns 750 are sent by the link exerciser 235a (on the master side) to the link exerciser 235b (on the slave side). The link exerciser 235b checks 755 for errors in the incoming patterns 750, and the link control unit 205b indicates (via status message 760) to the link control unit 205a if an error (or no error) had occurred. The patterns 750 may be sent for a predetermined number of cycles. When no error is detected during the link exercise 745, the tuning procedure terminates 750.

As also discussed above, whenever the AC current level is adjusted 725, the following steps are again performed: phase tuning 660, AC pulse test 705, deskew tuning 730, and link exercise 745.

Figure 12A:
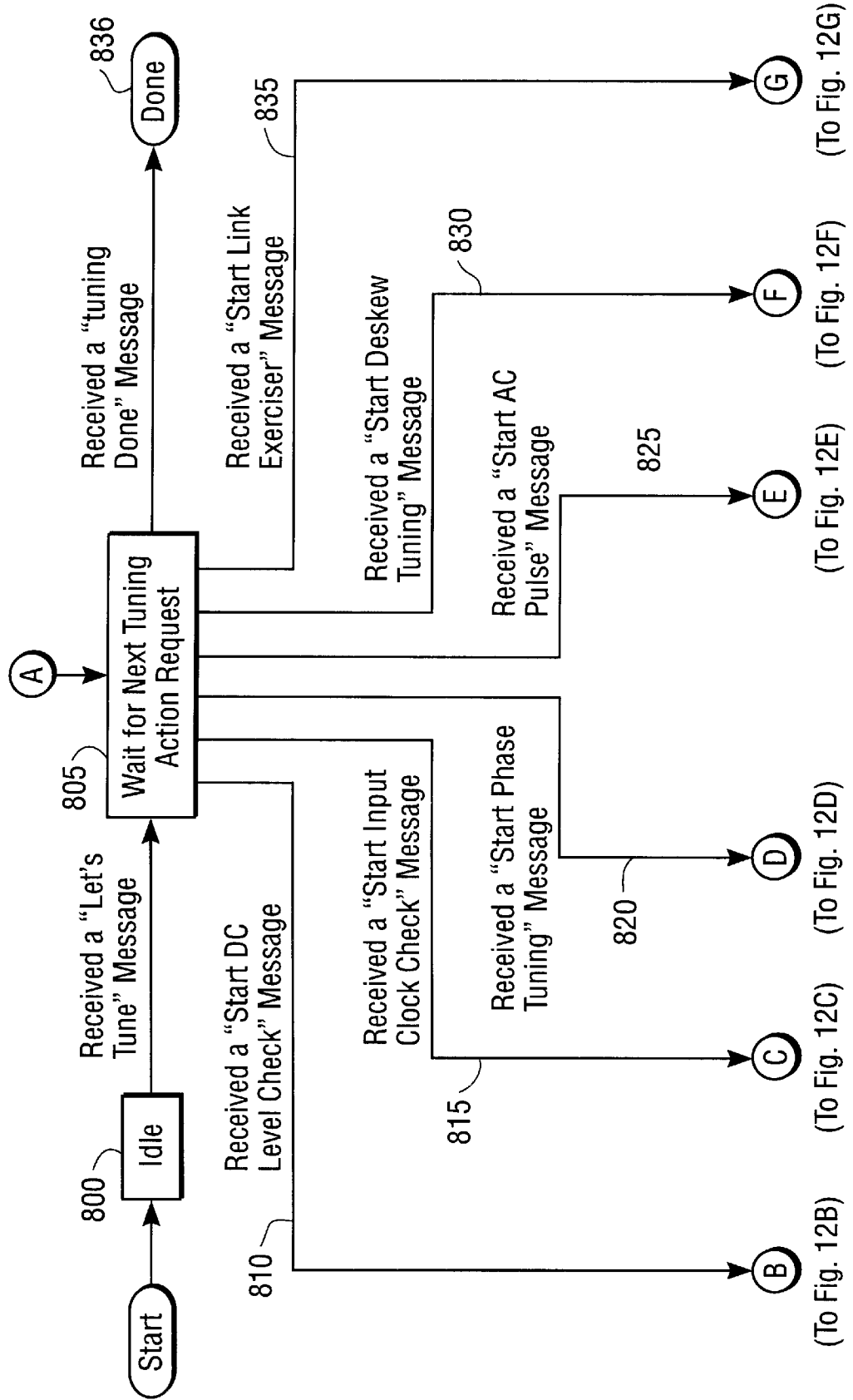

FIG. 10A is a table 763 listing the various codes that corresponds to particular control signals in the tuning procedure in accordance with the present invention. In particular, the code "00000100" (or "Let's tune in the me-to-you direction") is indicated in FIG. 10A as the event that causes the transition from an idle 800 (FIG. 12A) to a "waiting for a tuning action request" 805 (FIG. 12A). The codes 00000101 to 00000110 ("I'm done tuning the link in the me-to-you direction") is indicated as the event that causes the transition from a "waiting for a tuning action request" 805 (FIG. 12A) to done 836 (FIG. 12A). The code 00001000 ("DC Level Test Pattern", ZERO Level) is indicated by the test patterns 615 in FIG. 7 and in steps 1230, 1245, and 1255 in FIG. 14B. The code 00001011 ("DC Level Test Pattern", ONE Level) is also indicated by the test patterns 615 in FIG. 7 and in steps 1270, 1290 and 1310 in FIG. 14C. The codes 00001100 and 00001101 ("AC Pulse Test Pattern", ZERO Pulse) are indicated by test patterns 710 in FIG. 7 and in step 1510 in FIG. 17B. The codes 00001110 and 00001111 ("AC Pulse Test Pattern", ONE Pulse) are also indicated by test patterns 710 in FIG. 7 and in step 1516 in FIG. 17B.

FIG. 10B illustrates a table 762 with the various possible codes that are used to initiate and terminate the various steps in the tuning procedure 600 of FIG. 7. For example, the code 0001 0010 may be used to start the DC level test 605, while the code 0001 0011 may be used to stop the DC level test 605. The code 0001 0100 may be used to start the clock check 640, while the code 0001 0101 is used to stop the clock check 640. The control messages in table 762 are transmitted by the link control unit 205a to the link control unit 205b when tuning is performed in the master-to-slave direction 380 (FIG. 2A). The control messages in table 762 are transmitted by the link control unit 205b to the link control unit 205a when tuning is then performed subsequently in the slave-to-master direction 385 (FIG. 2A).

FIG. 10C is a table 764 listing the various codes that corresponds to particular control signals used for indicating the master-to-slave relationship and the values of the unique identifiers of the link control units in accordance with the present invention. The codes 0010000 to 0011111 ("I am X; you are who/slave/me/master") are indicated in step 435 in FIG. 3.

Figure 14A:
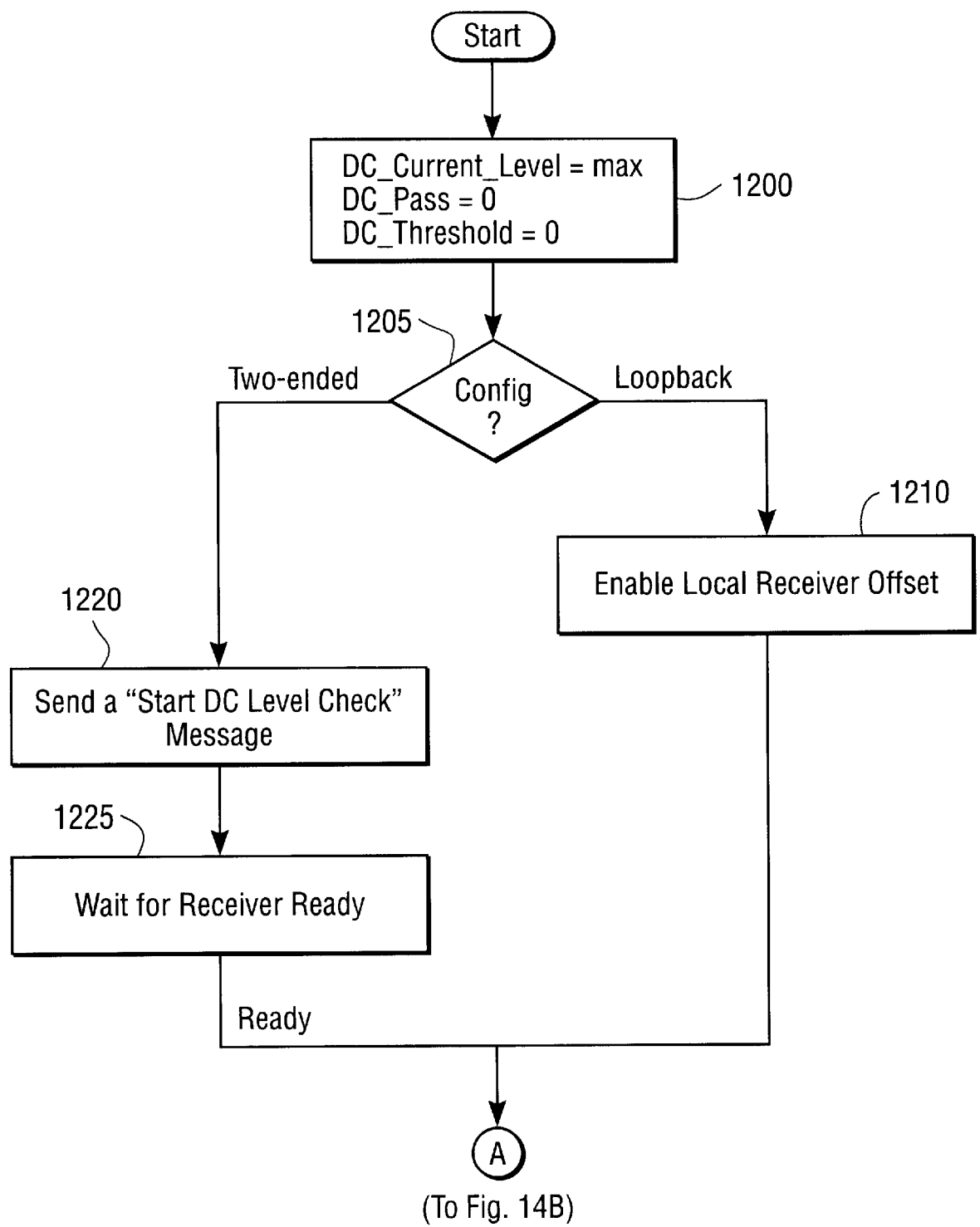
FIGS. 14A–14D illustrate a flowchart that shows a DC current level test and adjustment procedure in accordance with the present invention.

FIGS. 10D and 10E show tables 765 and 767, respectively, listing the various codes that corresponds to particular continuous status messages in accordance with the present invention. Note that continuous status messages are not used in loopback configurations (see FIG. 6). The codes 01001000 to 01001111 (Continuous Status Message for the "DC Level Test") are indicated in status message 625 in FIG. 7; in steps 855 and 870 in FIG. 12B; in step 1225 in FIG. 14A; in step 1240 in FIG. 14B; and in step 1280 in FIG. 14C. The codes 01010000 to 01010111 (Continuous Status Message for "Incoming Clock Check") are indicated by status message 655 in FIG. 7; in steps 900 and 910 in FIG. 12C; and in steps 1354 and 1360 in FIG. 15. The codes 01011000 to 01011111 (Continuous Status Message for "Phase Tuning") are indicated by status message 700 in FIG. 7; in steps 935 and 950 in FIG. 12D; and in steps 1408 and 1414 in FIG. 16A.

Reference is now made to FIG. 10E which illustrates a table 767 listing codes corresponding to other continuous status messages in accordance with the present invention. The codes 01100000 to 01100111 (Continuous Status Messages for the "AC Pulse Test") are indicated by status message 720 in FIG. 7; in steps 965 and 980 in FIG. 12E; in step 1508 in FIG. 17A; and in steps 1514 and 1520 in FIG. 17B. The codes 01101000 to 01101111 (Continuous Status Message for "Deskew Tuning") are indicated in status message 740 in FIG. 7; in steps 995 and 1010 in FIG. 12F; and in steps 1606 and 1612 in FIG. 18. The codes 01110000 to 01110111 (Continuous Status Message for "Link Exercise") are indicated in status message 760 in FIG. 7; in steps 1025 and 1040 in FIG. 12G; and in steps 1806 and 1812 in FIG. 19.

Figure 11:
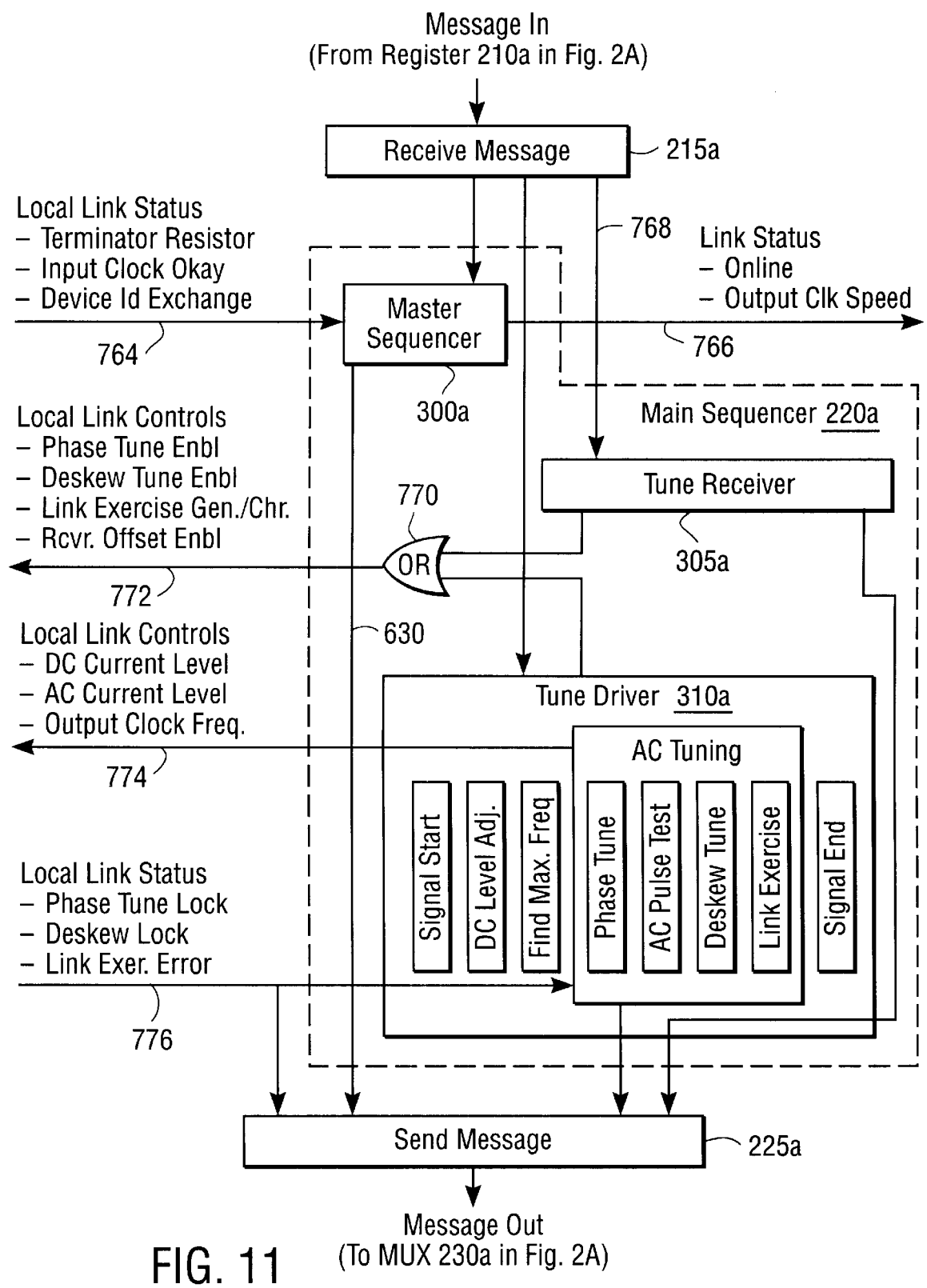
FIG. 11 is a functional block diagram showing additional details of the master sequencer in FIG. 2A.

FIG. 11 is a functional block diagram that shows additional details of the main sequencer 220a in FIG. 2A. The master sequencer 300a detects (via line 764) when the on chip terminator resistance circuit 500 (FIG. 5) locks. The master sequencer 300a also detects the arrival of the incoming clock CLK2 during initialization. The master sequencer 300a also determines the identification number of the link control unit 205b (FIG. 2B) so that a master-to-slave relationship is established during initialization between the link control units 205a and 205b. The master sequencer 300a also indicates (via line 766) the successful completion of the link tuning and initialization procedure 400 (through the "ONLINE" signal) and the speed of the link clock (through the "OUTPUT CLK SPEED" signal). It is noted further that the line 766 represents multiple signal lines. When asserted, the ONLINE signal indicates that the link 110a has been successfully tuned and is ready for high-speed data transmission. The OUTPUT CLK SPEED signal indicates the link transmission speed of fmax, fmax/2, fmax/4 or fmax/16, as mentioned in the example previously noted above.

The control lines 772, 774, 776 and other control lines in FIG. 11 also represent multiple signal lines.

The tune receiver 305a receives various feedback signals from link control unit 205b (FIG. 2B) via line 768. Various control signals from the tune receiver 305a and from the tune driver 310a are received by OR gate 770, and various control signals 772 are generated to enable the phase tuning, the deskew tuning, or the link exercise steps, as described above. In addition, the output of OR gate 770 generates the control signal for enabling the voltage offset in receiver 365b (FIG. 2B) during the tuning procedure in accordance with the present invention.

The tune driver 310a generates various control signals 774 that control the DC current level or AC current level at the driver 350a output (FIG. 2A). In addition, the tune driver 310a controls the frequency of the clock CLK1 at the clock driver 355a output (FIG. 2A). The tune driver 310a receives various status signals 776 from the link control unit 205b (FIG. 2B) including an indication of when the phase tuning and/or deskew tuning steps have locked (i.e., when the termination of phase tuning and/or deskew tuning is permitted). The tune driver 310a also receives from the link control unit 205b any detected errors during the link exercise.

The status messages from the link control unit 205b (FIG. 2B) are received (via receive message module 215a) by the master sequencer 300a, tune receiver 305b, and tune driver 310a, when tuning is performed in the master-to-slave direction 380 (FIG. 2A). When tuning is performed in the slave-to-master direction 385 (FIG. 2A), the master sequencer 300a, tune receiver 305b, and tune driver 310a send status messages (via send message module 225a) to the link control unit 205b (FIG. 2B).

FIGS. 12A to 12G are flow diagrams that describe the functionality of the tune receiver 305b in FIG. 2B. Assume that tuning will occur in the master-to-slave direction 380 (FIGS. 2A and 2B). The tune receiver 305b (FIG. 2B) is idle 800 until receiving a "LET'S TUNE" message from the link control unit 205a (FIG. 2A) on the master side, thereby indicating to the tune receiver 305b that the tuning procedure will begin. First, the tune receiver 305b receives 810 a "START DC LEVEL CHECK" message from the link control unit 205a (FIG. 2A), thereby indicating to the tune receiver 305b to start the DC level test 605 (FIG. 7). The "START DC LEVEL CHECK" message may represent the code 0001 0010 in table 762 of FIG. 10B. The operation of tune driver 305b proceeds as shown in FIG. 12B. The tune receiver 305b enables 850 the voltage offset of receiver 365b (FIG. 2B) on the slave side, thereby establishing an appropriate operating margin that compensates for temperature variations or other variations during network operations. The tune receiver 305b also sends 855 the status messages 625 (FIG. 7) to the link control unit 205a (FIG. 2A) to indicate if the receiver 365b is accurately detecting the DC level test patterns 615 (FIG. 7) from the driver 350a (FIG. 2A). The tune receiver 305b waits 860 for a stop message (to end the DC level test) from link control unit 205a (FIG. 2A). This stop message represents code 0001 0011 in table 762 of FIG. 10B. Upon receiving the stop message, the tune receiver 305b will disable 865 the voltage offset in receiver 365b and will stop sending 870 the continuous status signal 625 (FIG. 7) to the link control unit 205a (FIG. 2A). The tune receiver 305a then waits 805 (FIG. 12A) for the next tuning request from the link control unit 205a (FIG. 2A).

The tune receiver 305b then receives 815 a "START INPUT CLOCK CHECK" message from the link control unit 205a (FIG. 2A), thereby indicating to the tune receiver 305b to start the clock check 640 (FIG. 7). As shown in FIG. 12C, the tune receiver 305b then sends 900 to the link control unit 205a (FIG. 2A) the continuous status signal 655 (FIG. 7) indicating if the clock receiver 360b (FIG. 2B) on the slave side can recover the clock CLK1 from the clock driver 355a (FIG. 2A) on the master side. The tune receiver 305b waits 905 for a stop message (to end the clock check 640) from link control unit 205a (FIG. 2A). Upon receiving the stop message, the tune receiver 305b will stop sending 910 the continuous status signal 655 (FIG. 7) to the link control unit 205a (FIG. 2A). The tune receiver 305b then waits 805 (FIG. 12A) for the next tuning request from the link control unit 205a (FIG. 2A).

The tune receiver 305b then receives 820 a "START PHASE TUNING" message from the link control unit 205a (FIG. 2A), thereby indicating to the tune receiver 305b to start the phase tuning 660 (FIG. 7). As shown in FIG. 12D during the phase tuning step, the tune receiver 305b will enable 930 the local phase tuning circuit 370b (FIG. 2B) and sends 935 to the link control unit 205a (FIG. 2A) the continues status signals 700 (FIG. 7) indicating when the phase tuning step can be terminated. The tune receiver 305b waits 940 for a stop message (to end the phase tuning step) from the link control unit 205a (FIG. 2A). Upon receiving the stop message, the tune receiver 305b will disable 945 the phase tuning circuit 370b (FIG. 2B) and will stop sending 950 the continuous status signal 700 (FIG. 7) to the link control unit 205a (FIG. 2A). The tune receiver 305b then waits 805 (FIG. 12A) for the next tuning request from the link control unit 205a (FIG. 2A).

Figures 12E, 12F, 12G:
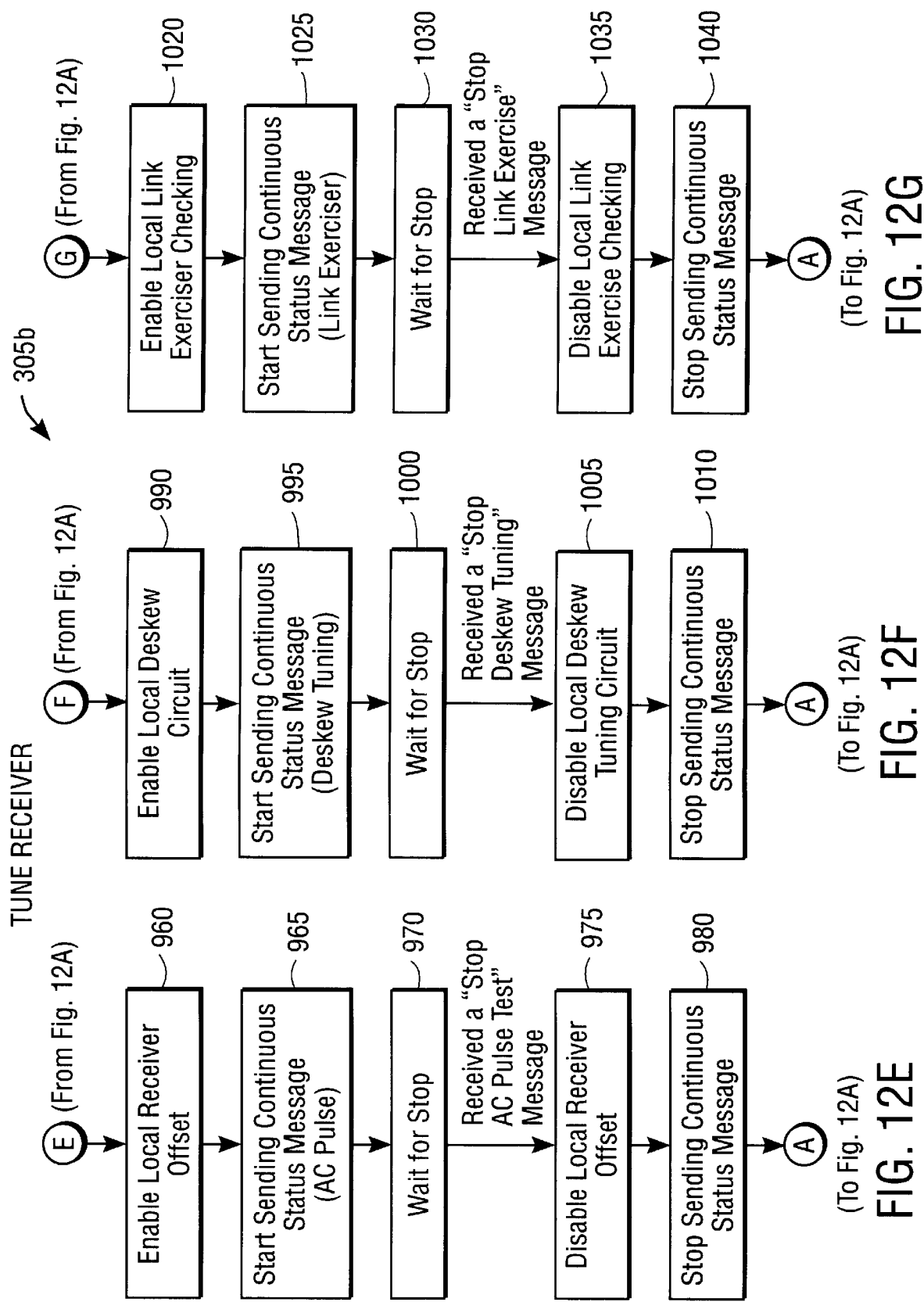

The tune receiver 305b then receives 825 a "START AC PULSE TEST" message from the link control unit 205a (FIG. 2A), thereby indicating to the tune receiver 305b to start the AC pulse test 705 (FIG. 7). As shown in FIG. 12E during the AC pulse test, the tune receiver 305b enables 960 a voltage offset in receiver 365b (FIG. 2B), thereby establishing an appropriate operating margin that compensates for temperature variations and/or other variations during network operations. The tune receiver 305b also sends 965 the status messages 720 (FIG. 7) to the link control unit 205a (FIG. 2A) to indicate if the receiver 365b is accurately detecting the AC level test patterns 710 (FIG. 7) from the driver 350a (FIG. 2A). The tune receiver 305b waits 970 for a stop message (to end the AC level test) from link control unit 205a (FIG. 2A). Upon receiving the stop message, the tune receiver 305b will disable 975 the voltage offset in receiver 365b and will stop sending 980 the continuous status signal 720 (FIG. 7) to the link control unit 205a (FIG. 2A). The tune receiver 305a then waits 805 (FIG. 12A) for the next tuning request from the link control unit 205a (FIG. 2A).

The tune receiver 305b then receives 830 a "START DESKEW TUNING" message from the link control unit 205a (FIG. 2A), thereby indicating to the tune receiver 305b to start the deskew tuning 730 (FIG. 7). As shown in FIG. 12F during the deskew tuning step, the tune receiver 305a will enable 990 the retiming/deskew circuit 255b (FIG. 2B) via deskew controller 250b (FIG. 2B). The tune receiver 305b also sends 995 to the link control unit 205a (FIG. 2A) the continuous status signals 740 (see FIG. 7) indicating whether the deskew tuning step can terminate. The tune receiver 305b waits 1000 for a stop message (to end the deskew tuning step) from link control unit 205a (FIG. 2A). Upon receiving the stop message, the tune receiver 305b will disable 1005 the retiming/deskew circuit 255b (FIG. 2B) and will stop sending 1010 the continuous status signal 740 (FIG. 7). The tune receiver 305b then waits 805 (FIG. 12A) for the next tuning request from the link control unit 205a (FIG. 2A).

The tune receiver 305b then receives 835 a "START LINK EXERCISE" message from the link control unit 205a (FIG. 2A), thereby indicating to the tune receiver 305b to start the link exercise 745 (FIG. 7). As shown in FIG. 12G during the link exercise step, the tune receiver 305b will enable 1020 the pattern checker in the link exerciser 235b (FIG. 2B). The tune receiver 305b also sends 1025 to the link control unit 205a (FIG. 2A) the continuous status signals 760 (FIG. 7) indicating if errors (or no errors) occur in response to the test data patterns 750 (FIG. 7) from link exerciser 235a (FIG. 2A). The tune receiver 305b waits 1030 for a stop message (to end the link exercise step) from the link control unit 205a (FIG. 2A). Upon receiving the stop message, the tune receiver 305b will disable 1035 the pattern checker in link exerciser 235b (FIG. 2B) and will stop sending 1040 the continuous status signal 760 (FIG. 7). The tune receiver 305a then waits 805 (FIG. 12A) for the next tuning request from the link control unit 205a (FIG. 2A). When a "TUNING DONE" message is received by the tune receiver 305b, the tune receiver 305b stops 836 waiting for the next tuning action request.

Figure 13:
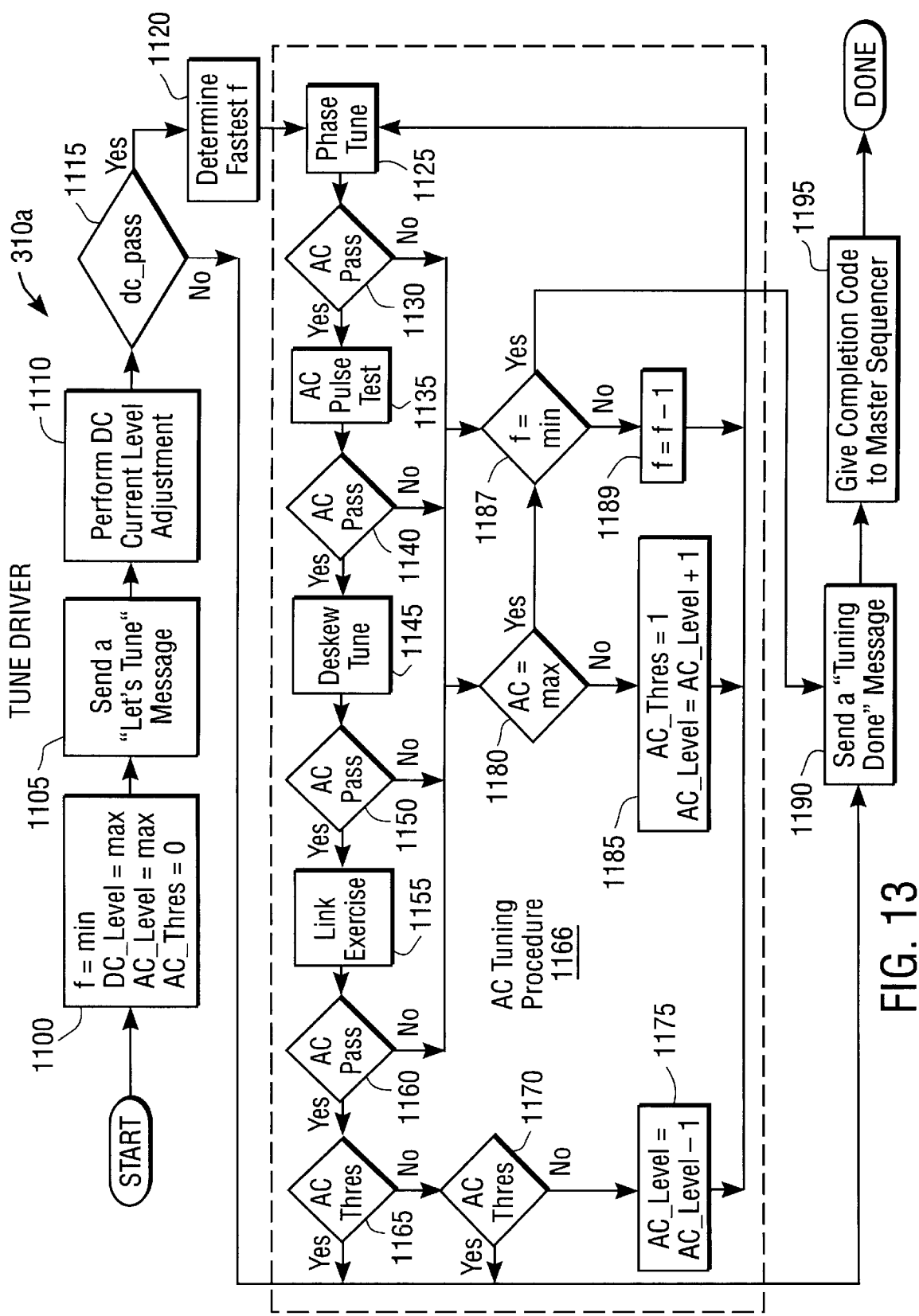
FIG. 13 is a flowchart that shows the functionality of the tune driver in FIG. 2A.

FIG. 13 is a flow diagram that describes the functionality of the tune driver 310a in FIG. 2A when tuning is performed in the master-to-slave direction 380 (FIG. 2A). Initially, the frequency of the clock driver 355a is set 1100 at a minimum value (e.g., fmax/16), while the DC current level and the AC current level of the driver 350a output are set at the maximum level. The parameter AC_THRES is also set to "0" so that an AC Threshold flag is set to zero. This flag indicates that the AC tuning procedure has found the boundary between the lowest AC current setting that works and the highest AC current setting that fails. Subsequently, the AC current is set to the minimum value that works.

The tune driver 310a then sends 1105 to the tune receiver 305b (FIG. 2B), on the slave side, a "LET'S TUNE" message so that the tuning procedure 600 (FIG. 7) can begin. The tune driver 310a performs 1110 any DC current level adjustments for the output of the driver 350a (FIG. 2A). In step 1115, if the tune driver 310a is unable to set a DC current level that is detectable by the receiver 365b (FIG. 2B), then the tune driver 310a will send 1190 a "TUNING DONE" message to the tune receiver 305b (FIG. 2B). The tune driver 305a will then send 1195 a completion code to the master sequencer 300a (FIG. 2A) that the tuning procedure 600 (FIG. 7) is complete. Preferably, a status code is included in the completion code wherein the status code indicates success or failure in the tuning procedure (as shown in particular codes in tables 763 in FIGS. 10A)

Assume that in step 1115, the tune driver 310a has set the minimum DC current level that is detectable by the receiver 365b (FIG. 2B). The tune driver 310a will then set 1120 the fastest possible frequency in which the link 110a can operate. The tune driver 310a will then check 1125 if the phase tuning step has been completed. When the phase tuning step has been completed, the tune driver 310a checks 1130 if the previous AC tuning step (i.e., the previous phase tuning step) was completed successfully. If not, then the tune driver 310a checks 1180 if the AC current level is at the maximum value. If not, then the tune driver 310a increases 1185 the AC current level and returns to step 1125 to check for the completion of another phase tuning step.

If, in step 1180, the AC current level is at the maximum value, then the tune driver 310a checks 1187 if the frequency of the clock signal CLK1 from clock generator 355a (FIG. 2A) is at the minimum possible clock frequency value. If so, then the tune driver 310a sends 1190 a "TUNING DONE" message to the tune receiver 305b (FIG. 2B) on the slave side, and sends 1195 a completion code to the master sequencer 300a (FIG. 2A) to complete the tuning procedure. Preferably, an error message is included in the completion code. If, in step 1187, the frequency of the clock signal CLK1 from clock generator 355a (FIG. 2A) is not at the minimum level, then the frequency of the clock signal CLK1 is decreased to the next level, and the tune driver 310a waits 1125 for the completion of a repeated phase tuning step.

If, in step 1130, the previous phase tuning step was completed successfully, then the tune driver 310a performs 1135 the AC pulse test as described above. The tune driver 310a then checks 1140 if the AC current level of the driver 350a output satisfies the AC Threshold flag. If not, then the above mentioned steps (beginning with step 1180) are again repeated.

The tune driver checks 1145 for the deskew tuning step to be completed, and checks 1150 if the previous AC pulse test was completed successfully. If not, then the above-mentioned steps (beginning with step 1180) are again performed.

The tune driver 350a then waits 1155 for the link exercise to be completed, and again checks 1160 if the AC current level of the driver 350a output satisfies the AC Threshold flag. If so, then a check 1165 is performed to determine if, in the AC tuning procedure 1166, the AC current level has dropped below the minimum current level required for operation. If so, then the tune driver 310a send 1190 a "TUNING DONE" message to the tune receiver 305b (FIG. 2B), and then sends 1195 a completion code to the master sequencer 300a (FIG. 2A) that the tuning procedure 600 (FIG. 7) is complete. Preferably, a tuning error message is included in the completion code.

If the AC current level has not dropped below the minimum current level required for operation, then the method proceeds in step 1170. In step 1170, the tune driver 310a determines if the AC current level of the driver 350a output is at the minimum level. If so, then the tune driver 310a sends 1190 a "TUNING DONE" message to the tune receiver 305b (FIG. 2B) on the slave side and the tuning procedure ends. If, in step 1175, the AC current level of the driver 350a output is not at the minimum level, then the tune driver 310a decreases 1175 the AC current level of the driver 350a output, and the tune driver 310a checks 1125 for a repeated phase tuning step to end. The step 1130 and subsequent steps are then repeated.

FIGS. 14A–14D illustrate a flowchart that shows the DC current adjustment and level test method in additional detail. Assume that tuning is performed in the master-to-slave direction 380 (FIG. 2A). Initially, in step 1200, the DC current level of the driver 350a output is set at the maximum value. The parameter DC_PASS is set to "0" wherein the DC_PASS is a flag which, when set to "1", means that the DC level test had worked for at least the highest DC current setting. The parameter DC_THRESHOLD is set to "0" wherein the DC_THRESHOLD is a flag which, when set to "1", means that the DC current adjustment procedure has found the boundary between the lowest DC current level setting that works (with the voltage offset enabled in a link receiver) and the highest DC current setting that fails. Subsequently, the DC current level is set to the minimum value that works. The configuration 1205 of the router involved in the tuning operation determines the subsequent steps in the DC current adjustment and level test method. If a loopback configuration exists, then the receiver 365a offset is enabled and the method proceeds to FIG. 14B. If, a two-ended (normal) configuration exists, then the tune driver 310a (FIG. 2A) sends 1220 a "START DC LEVEL CHECK" message to the tune receiver 305b (FIG. 2B) on the slave side to initiate the DC level test procedure. In step 1225, the tune driver 310a again waits for a "RECEIVER READY" message. When the tune driver 310a receives the message, then the receiver 365b (FIG. 2B) on the slave side is ready for the DC level test procedure.

Figure 14B:
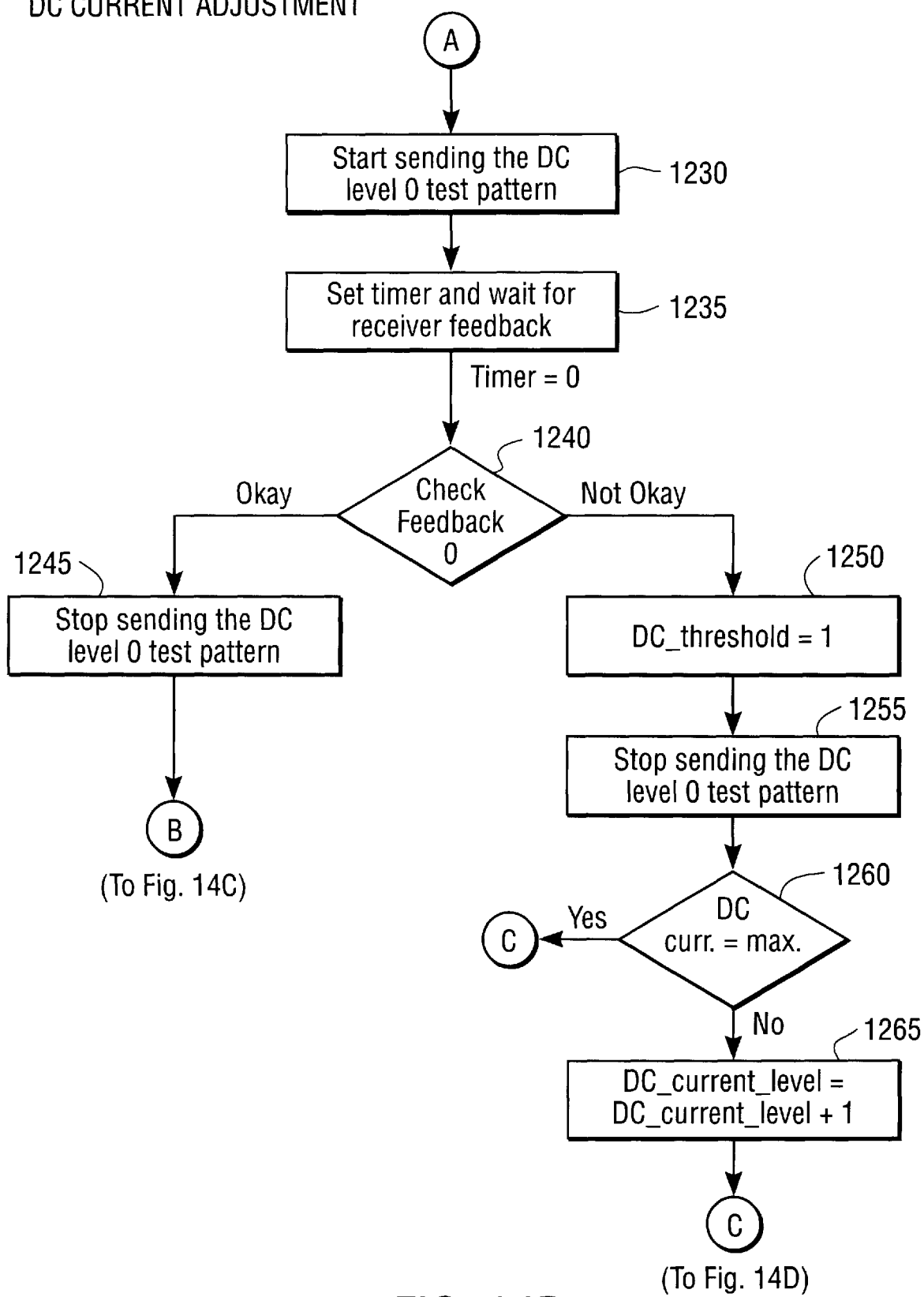

Referring now to FIG. 14B, in step 1230 the link control unit 205a (FIG. 2A) enables the transmission of the DC level test patterns (a continuous low or "0" level pattern) to the receiver 365b (FIG. 2B). The link control unit 205a then sets 1235 a timer and waits for the feedback from the link control unit 205b (FIG. 2B) on the slave side.

In step 1240, the feedback from the link control unit 205a is checked for the low or "0" level patterns. If no errors are detected, then in step 1245 the link control unit 205a (FIG. 2A) then stops sending the test patterns with low levels, and the procedure proceeds to FIG. 14C. If errors are detected in step 1240, then the parameter DC_THRESHOLD is set equal to 1 in step 1250. The link control unit 205a stops sending 1255 the test patterns.

In step 1260, it is determined if the output DC current level of the driver 350a output (FIG. 2B) is at the maximum DC current level value. If so, then the method proceeds to the steps shown in FIG. 14D. If not, then the DC current level is incremented 1265 to the next value, and the method proceeds to the steps shown in FIG. 14D.

Figure 14C:
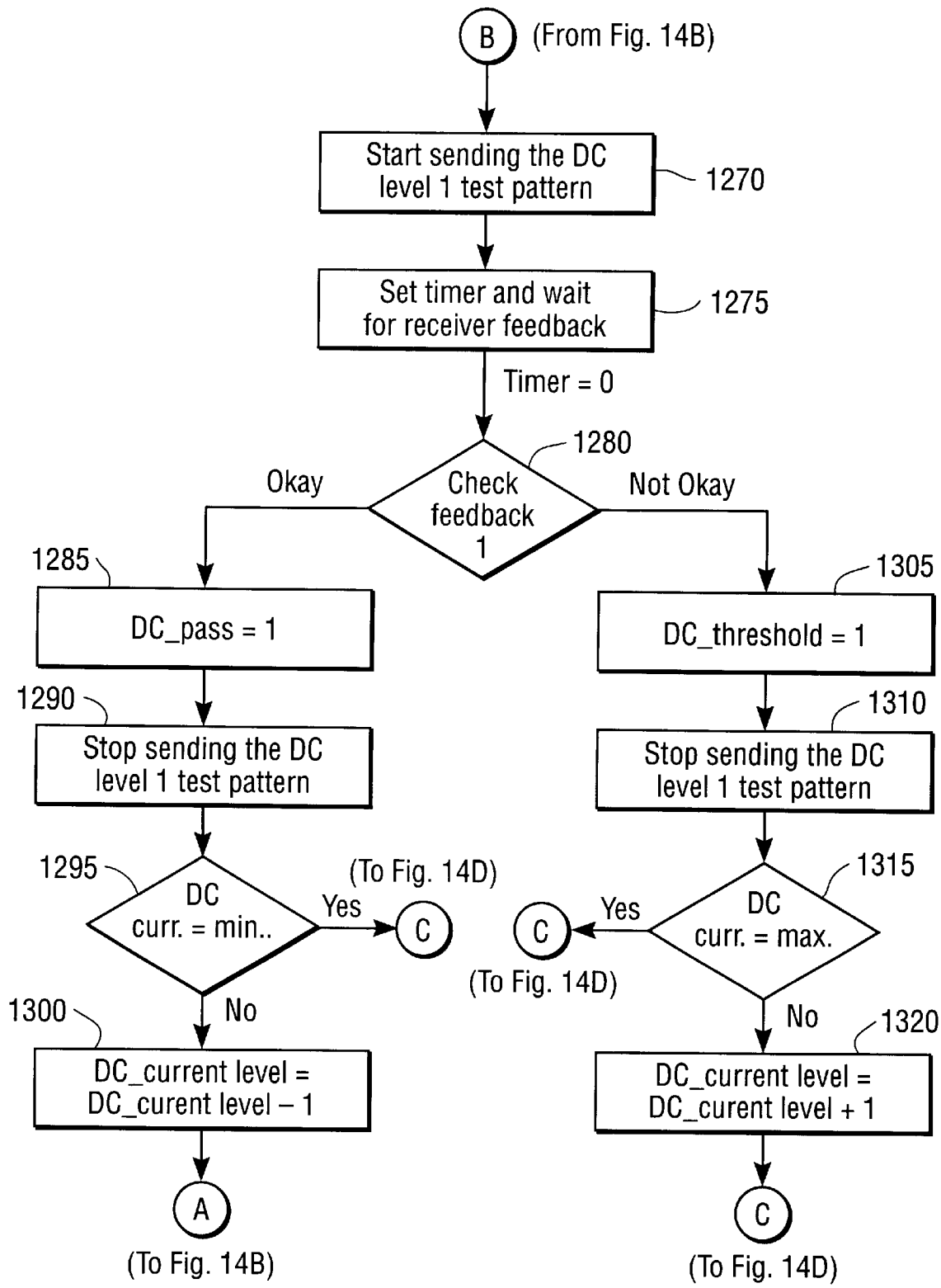

Referring now to FIG. 14C, in step 1270 test patterns with positive or "1" level are sent to the receiver 365b (FIG. 2B). The link control unit 205a (FIG. 2A) sets a timer and waits for feedback from the link control unit 205b (FIG. 2B). In step 1280, the feedback from link control unit 205b is checked for errors. If no errors are detected, the method sets 1285 the parameter DC_PASS equal to "1", and stops sending 1290 the level "1" test patterns. If, in step 1295, the DC current level of the driver 350a output (FIG. 2A) is at the minimum value, then the method proceeds to the steps shown in FIG. 14D. If the DC current level is not at the minimum value, then the DC current level is decreased 1300 to the next level and the method proceeds to the steps shown in FIG. 14B.

In step 1280, if errors are detected in the feedback from the link control unit 205b (FIG. 2B), then the parameter DC_THRESHOLD is set equal to "1". The link control unit 205a (FIG. 2A) then stops 1310 sending the test patterns with a "1" level. In step 1315, it is determined if the DC current level is at maximum value. If so, then the method proceeds to the steps shown in FIG. 14D. If not, then the method proceeds to step 1320 wherein the DC current level is incremented to the next level.

Figure 14D:
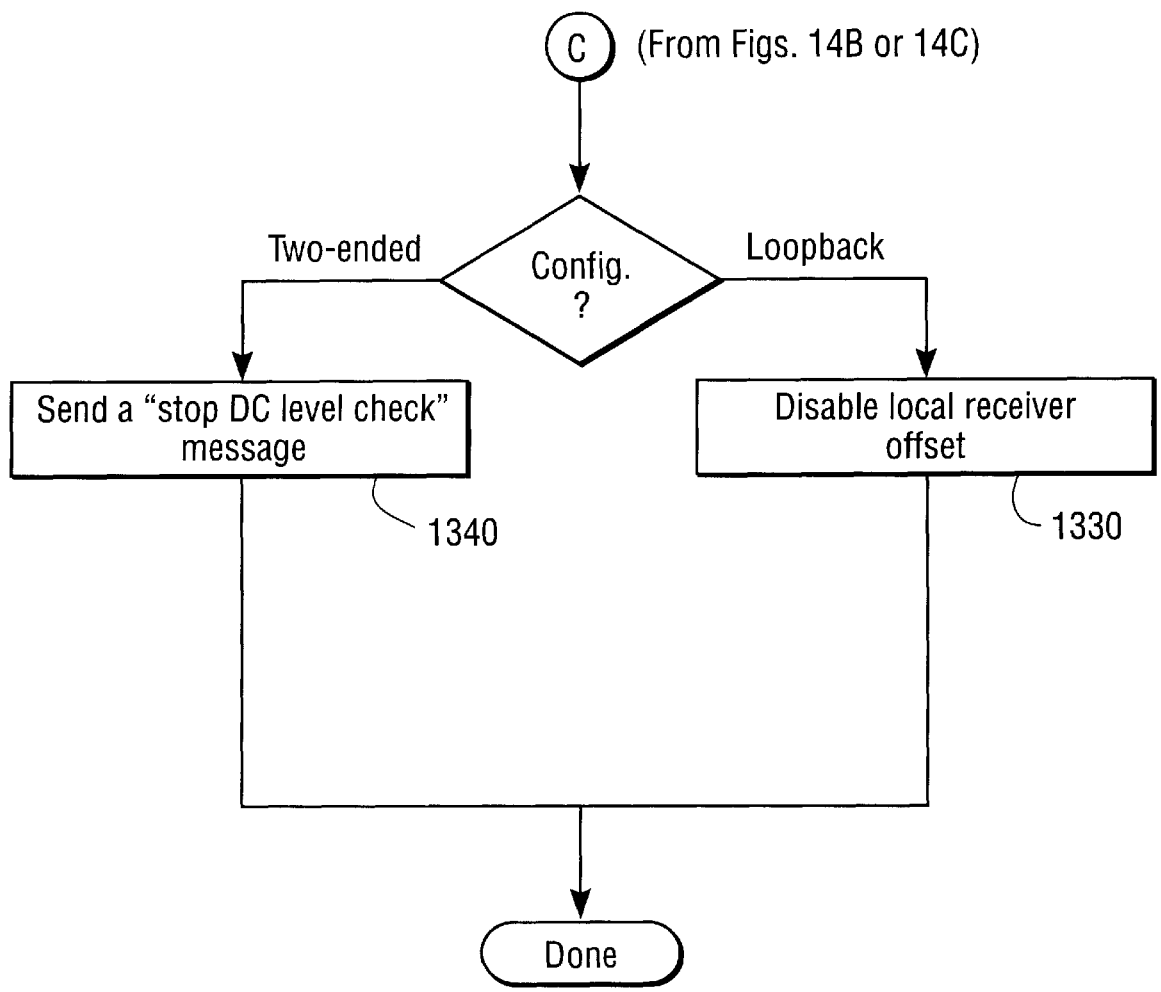

Referring now to FIG. 14D, the configuration of the router 105a (FIG. 1) again determines the subsequent steps in the method. If a loopback configuration exists, then the offset in receiver 365a (FIG. 2A) is disabled 1330, and the DC current adjustment and level test method terminates. If, however, a two-ended configuration exists, then the link control unit 205a sends 1340 a "STOP DC LEVEL CHECK" message to terminate the DC level test procedure.

Figure 15:
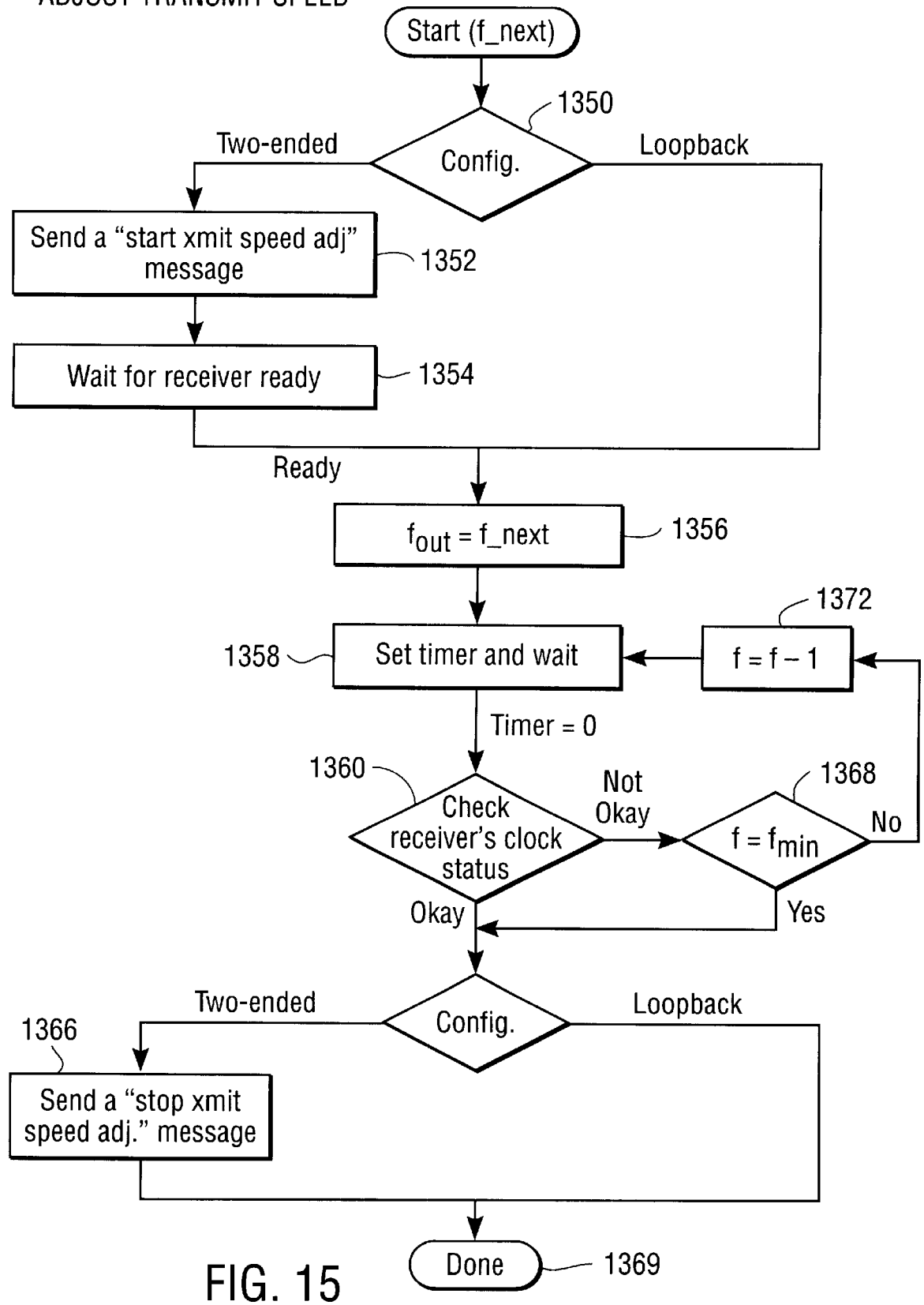
FIG. 15 is a flowchart illustrating a clock test and adjustment procedure in accordance with the present invention.

FIG. 15 is a flowchart illustrating additional details of the clock check procedure in accordance with the present invention. Assume again that tuning is performed in the master-to-slave direction. The configuration 1350 determines the subsequent steps in the method. If a two-ended configuration exists, then the link control unit 205a sends 1352 a "START XMT SPEED ADJ" message to the tune receiver 305b (FIG. 2B) to begin adjustment of the clock CLK1 speed. The link control unit 205a then waits 1354 for a "RCVR READY" message from the link control unit 205b (FIG. 2B) to indicate that the clock receiver 360b (FIG. 2B) is ready to receive signals. The output frequency of clock driver 355a (FIG. 2A) is then set to $F_{13}$ NEXT in step 1356 for purposes of changing the transmission clock frequency. In step 1358, the link control unit 205a (FIG. 2A) sets a timer and waits. In step 1360, the link control unit 205a checks the status of the clock receiver 360b (FIG. 2B) based upon status messages from the link control unit 205b (FIG. 2B).

The configuration of the router 105a (FIG. 1) then determines the next step in the method. If a two-ended configuration exists, then the link control unit 205a (FIG. 2A) sends 1366 a "STOP XMT SPEED ADJ" message to the link control unit 205b (FIG. 2B) to terminate the clock check step and the method terminates 1369.

If, in step 1360, an error is detected based on the status messages from the link control unit 205b (FIG. 2B), then a check 1368 is performed to determine if the clock CLK1 frequency is at the minimum value. If so, then the method either proceeds to step 1366 or terminates, depending on if a two-ended or a loopback configuration exists. If, in step 1368, the CLK1 clock frequency is not at the minimum value, then the CLK1 clock frequency is decreased to the next level and step 1358 and subsequent steps are repeated.

Figure 16A:
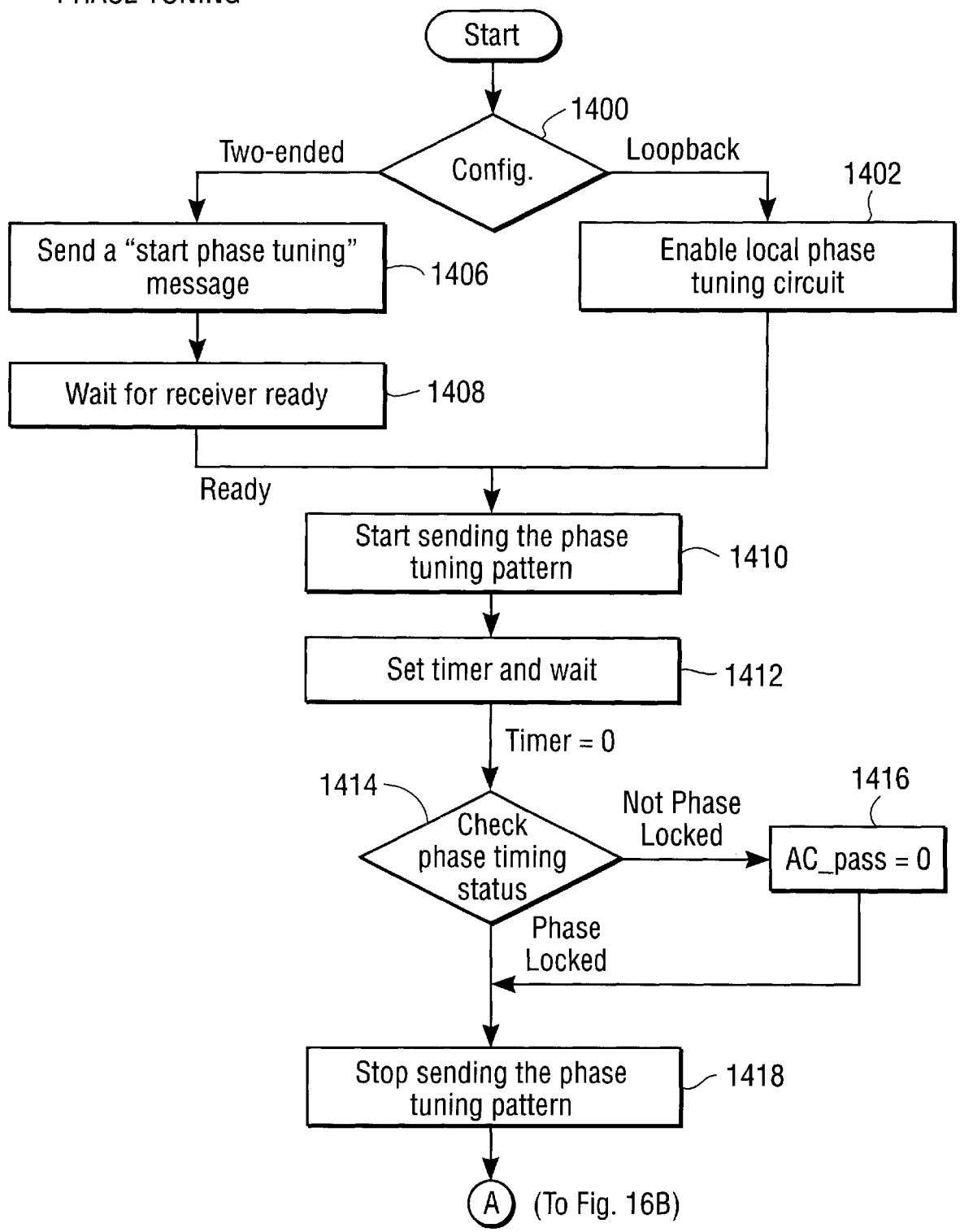
FIGS. 16A–16B illustrate a flowchart that shows a phase tuning procedure in accordance with the present invention.
Figure 16B:
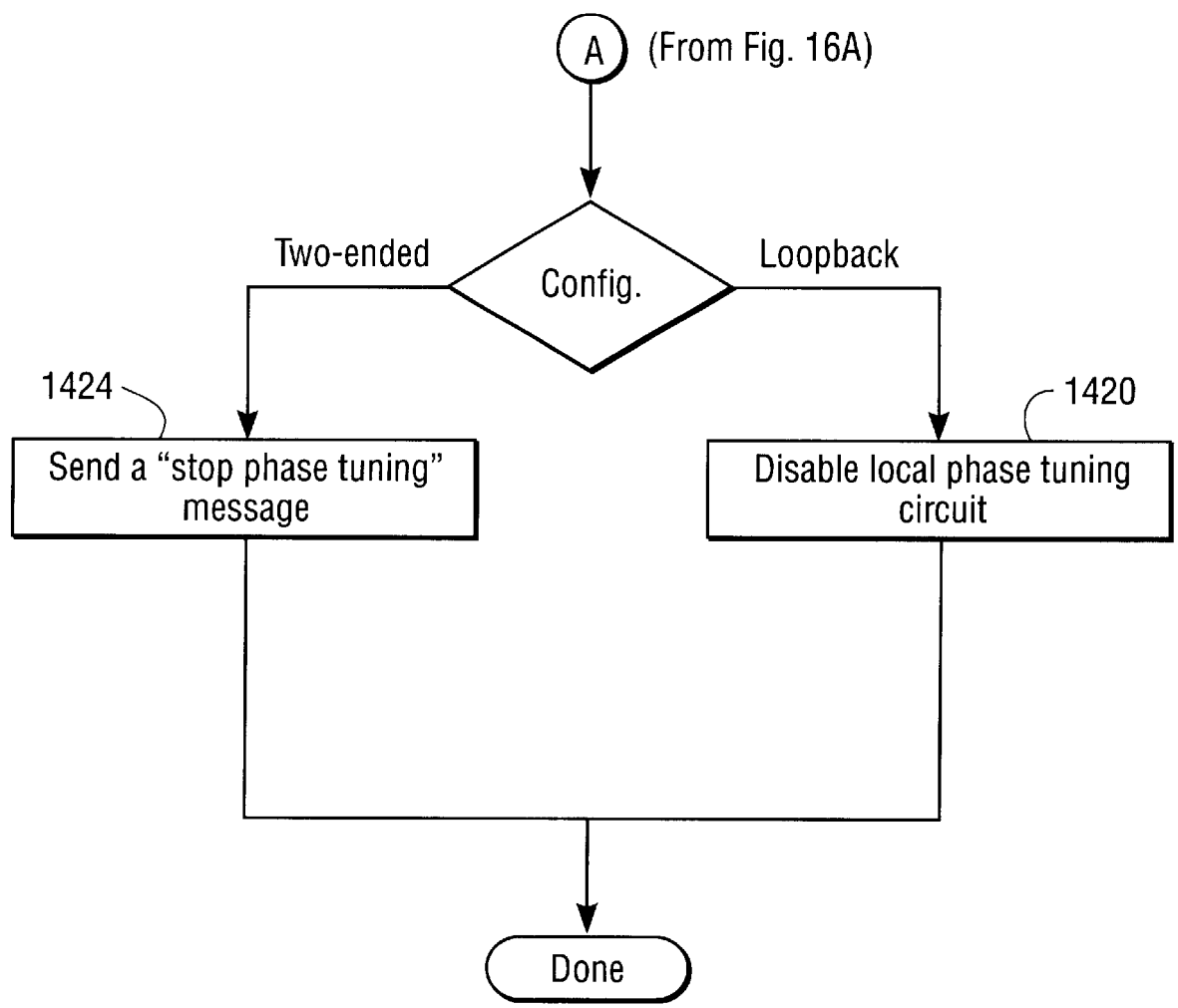

FIGS. 16A–16B illustrate a flowchart that shows additional details of the phase tuning method in accordance with the present invention. Assume again that tuning is performed in the master-to-slave direction, The configuration 1400 of the router 105a determines the subsequent steps in the method. If a loopback configuration exists, then the phase tuning circuit 370a (FIG. 2A) is enabled 1402 and the method proceeds to step 1410. If a two-ended configuration exists, then the link control unit 205a (FIG. 2A) sends 1406 a "START PHASE TUNING" message to initiate the phase tuning procedure. The link control unit 205a then waits 1408 for a "RECEIVER READY" message indicating that the receiver 360b is ready to receive clock signals from the clock driver 355a (FIG. 2A) and that the receiver 365b is ready to receive the phase tuning data patterns.

In step 1410, the link control unit 205a (FIG. 2A) enables the driver 350a to send the phase tuning patterns to the receiver 365b on the slave side. In step 1412, the link control unit 205a sets a timer and waits. In step 1414, the link control unit 205a checks the phase tuning status message from the link control unit 205b (FIG. 2B). If phase tuning is not yet complete, then the parameter AC_PASS is set 1416 to "0" for purposes of indicating that this AC tuning iteration has failed and the method proceeds to step 1418. The link control unit 205a stops sending 1418 the phase tuning pattern to the slave side.

Referring now to FIG. 16B, if the loopback configuration exists, then after step 1418, the local phase tuning circuit 370a (FIG. 2A) is disabled 1420 and the phase tuning method terminates. If a two-ended configuration exists, then after step 1418, the link control unit 205a sends 1424 a "STOP PHASE TUNING" message to the link control unit 205b to terminate the phase tuning procedure. The phase tuning procedure terminates.

Figure 17A:
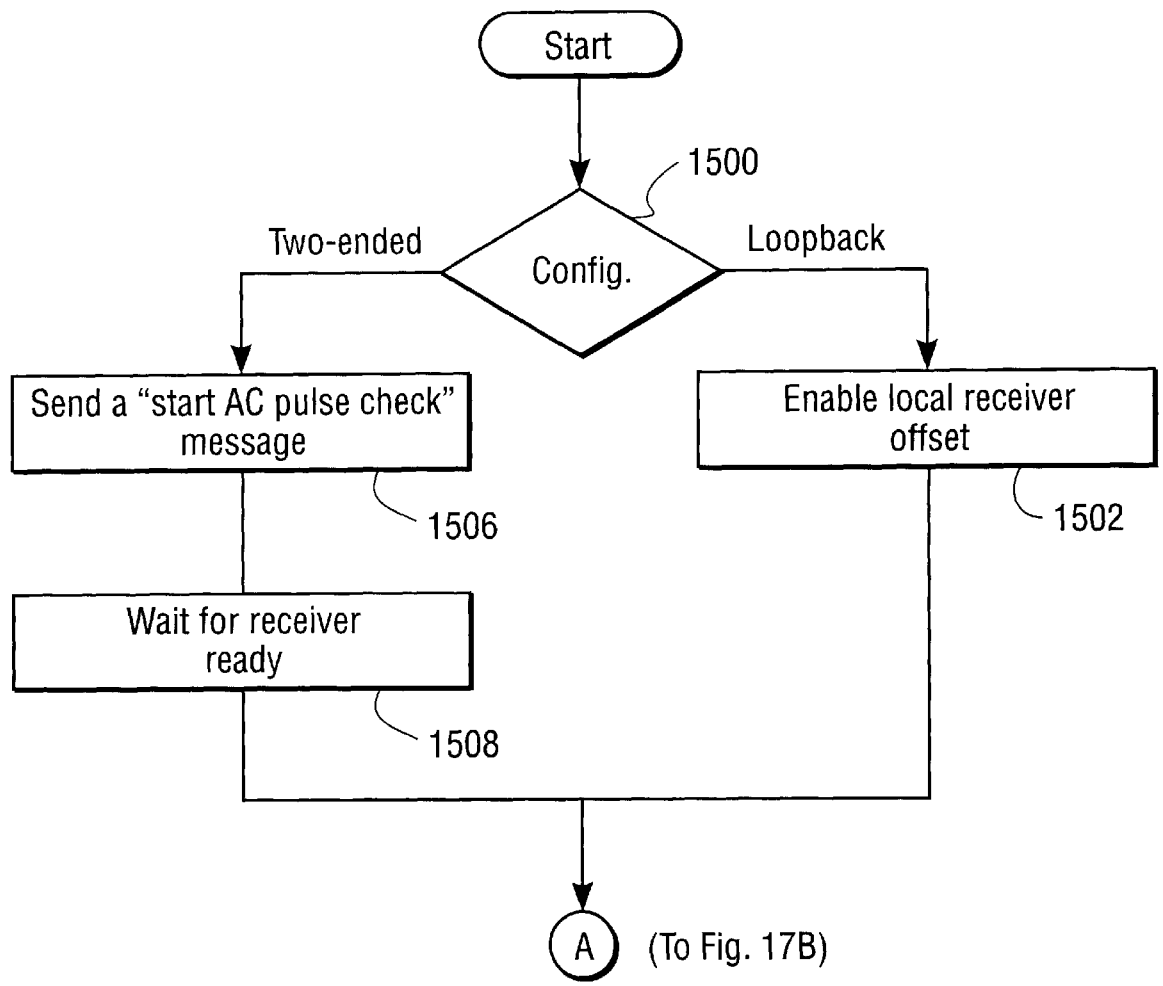
FIGS. 17A–17C illustrate a flowchart that shows an AC pulse test procedure in accordance with the present invention.
Figure 17B:
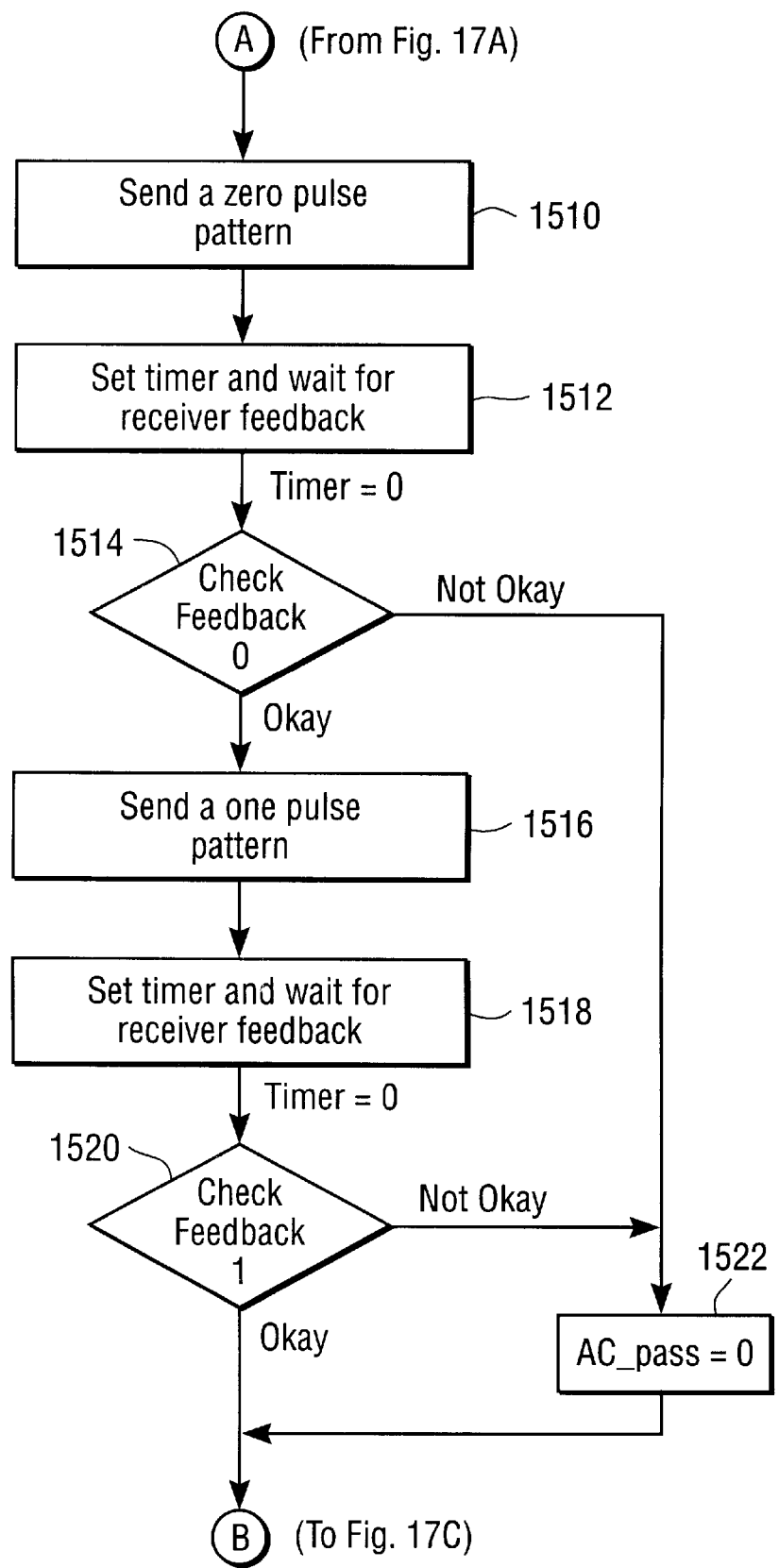
Figure 17C:
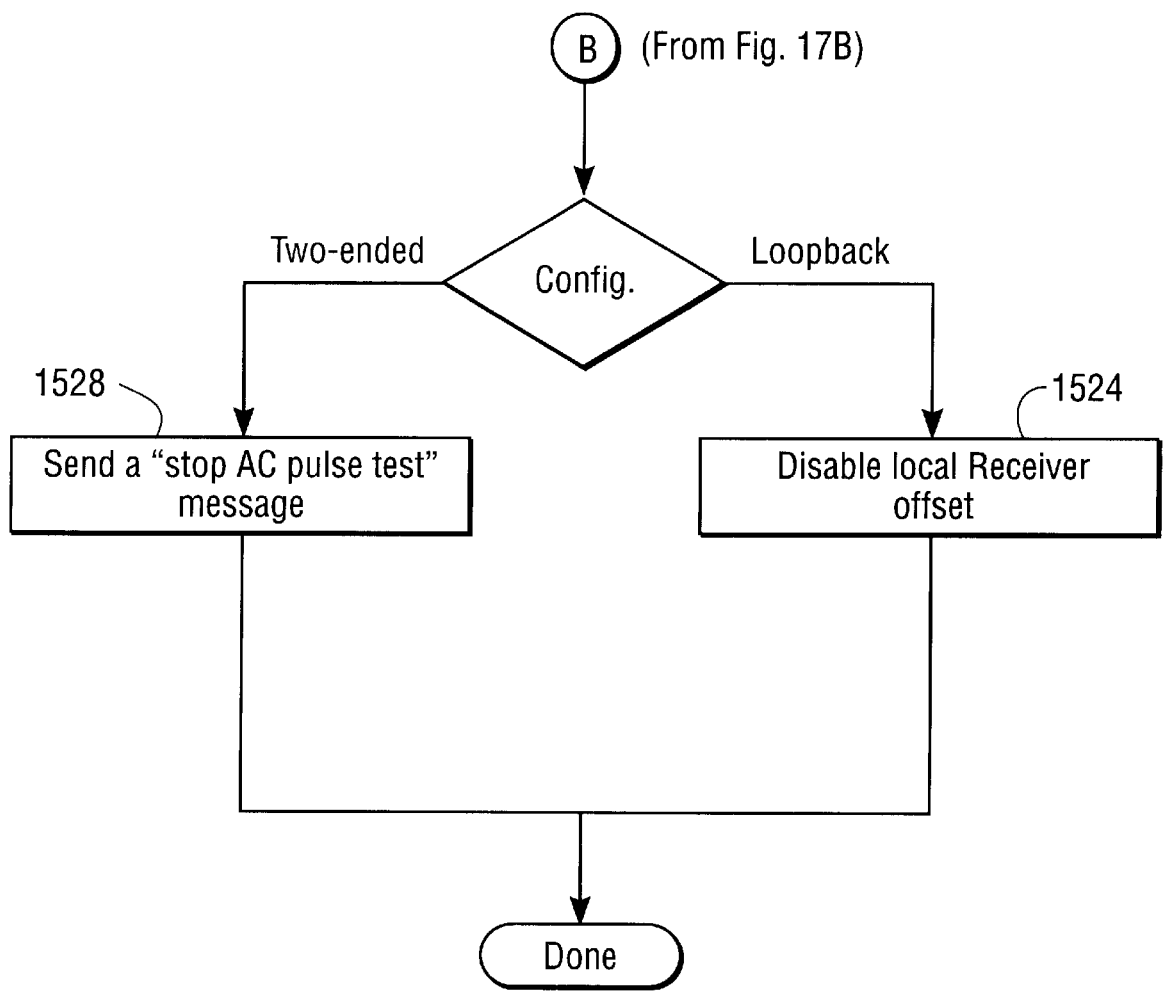

FIGS. 17A–17C show a flowchart of the AC pulse test in additional details. Assume that the tuning is performed in the master-to-slave direction. The configuration 1500 of the router 105a determines the steps in the method. If a loopback configuration exists, then the link control unit 205a enables 1502 a voltage offset in the receiver 365a (FIG. 2A) and the method proceeds to the steps shown in FIG. 17B. If a two-ended configuration exists, then the link control unit 205a sends 1506 a "START AC PULSE TEST" message to the link control unit 205b (FIG. 2B) to start the AC pulse test. The link control unit 205a waits for a "RECEIVER READY" message from link control unit 205b to indicate that the receiver 365b (FIG. 2B) is ready to perform the AC pulse test.

Referring now to FIG. 17B, the link control unit 205a sends 1510 a zero pulse pattern to the receiver 365b on the slave side, and sets 1512 a timer and waits for feedback from link control unit 205b (FIG. 2B). In step 1514, the link control unit 205a checks 1514 for feedback from link control unit 205b on the zero pulse pattern. If an error is detected, then the method proceeds to step 1522 wherein the parameter AC_PASS is set to "0" for purposes of indicating that this AC tuning iteration has failed, and then to the steps in FIG. 17C. If no error is detected in step 1520, then the link control unit 205a sends 1516 a "1" pulse pattern to the receiver 365b (FIG. 2B) on the slave side. The link control unit 205a sets 1518 a timer and waits for feedback from link control unit 205b. In step 1520, the feedback from link control unit 205b is checked. If an error is detected, then method proceeds to step 1522 and then to the steps in FIG. 17C. If, in step 1520, no error is detected on the feedback from link control unit 205b, then the method proceeds to the steps in FIG. 17C.

In FIG. 17C, if a loopback configuration exists, then the link control unit 205a disables 1524 the voltage offset of the receiver 365a (FIG. 2A). If a two-ended configuration exists, then the link control unit 205a sends 1528 a "STOP AC PULSE TEST" message to the link control unit 205b to terminate the AC pulse test procedure, and the AC pulse test method terminates.

Figure 18:
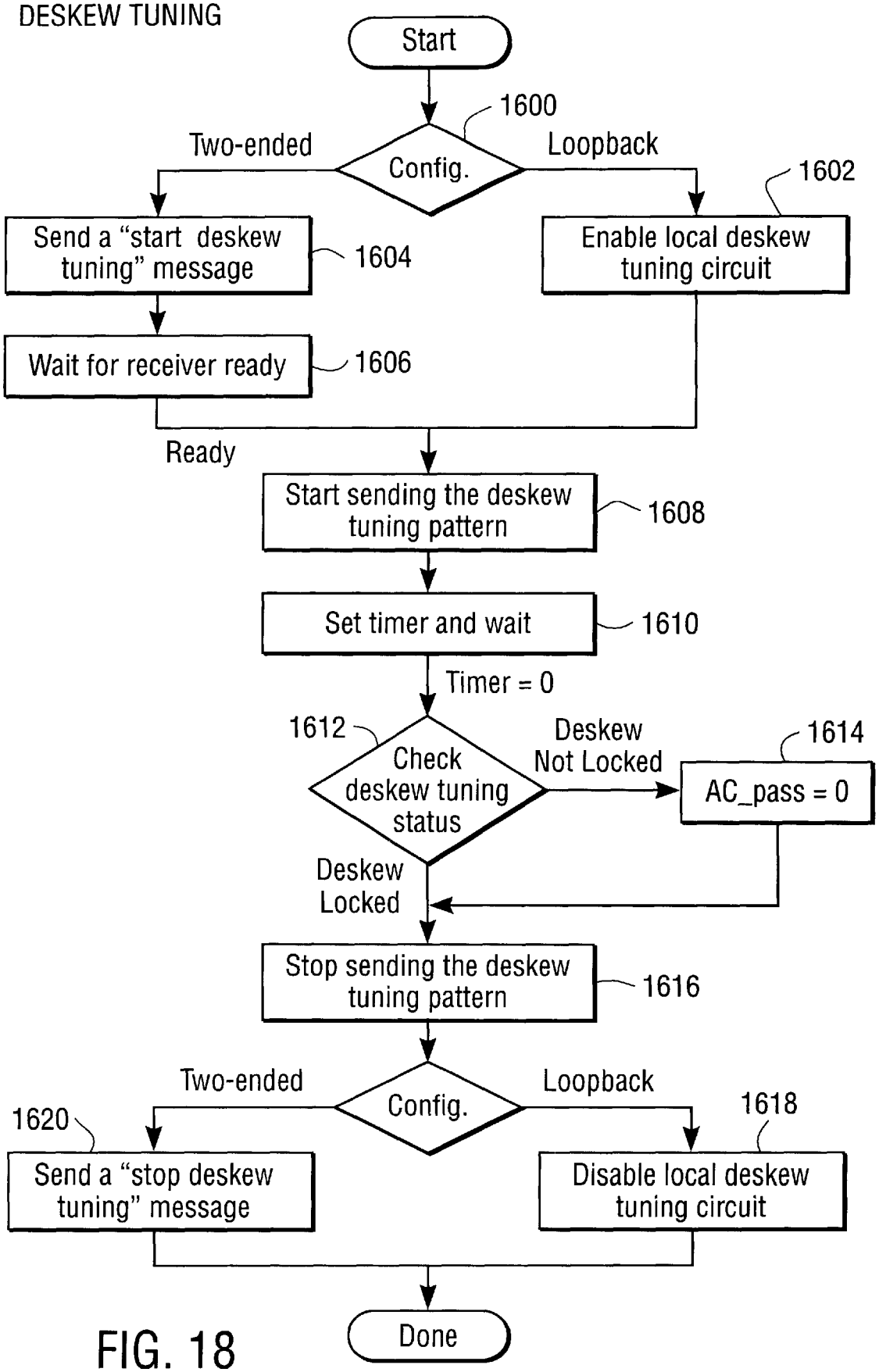
FIG. 18 is a flowchart that shows a deskew tuning procedure in accordance with the present invention.

FIG. 18 is a flowchart illustrating,additional details of the deskew tuning procedure in accordance with the present invention. Assume that the tuning procedure is performed in the master-to-slave direction. The configuration 1600 of the router 105a (FIG. 1) determines the subsequent steps in the method. If a loopback configuration exists, then the link control unit 205a (FIG. 2A) enables 1602 the deskew tuning circuit 255a in FIG. 2A (via deskew controller 250a). If a two-ended configuration exists, then the link control unit 205a sends 1604 a "START DESKEW TUNING" message to the link control unit 205b to begin the deskew tuning procedure. In step 1606, the basic control circuit 205a waits for a "RCVR READY" message from basic control circuit 205b (FIG. 2B) indicating that the receiver 365b (FIG. 2B) is ready to perform the deskew tuning procedure.

In step 1608, the send message module 225a in link control unit 205a (FIG. 2A) sends the deskew tuning patterns to the receiver 365b (FIG. 2B). The link control unit 205a sets 1610 a timer and waits. In step 1612, the link control unit 205a checks the deskew status signal received from link control unit 205b (FIG. 2B). If the deskew status signal indicates that the deskew tuning procedure has not yet achieved a deskew lock, then the method proceeds to step 1614 wherein the parameter AC_PASS is set to "0" for purposes of indicating that this iteration of the AC tuning procedure has failed. If, in step 1612, the deskew status signal indicates that the deskew tuning procedure has been completed, then the link control unit 205a stops sending 1616 the deskew tuning pattern. For a loopback configuration, the deskew tuning circuit 255a (FIG. 2A) is then disabled 1618, and the deskew tuning procedure terminates. For a two-ended configuration, the link control unit 205a sends 1620 a "STOP DESKEW TUNING" message to the link control unit 205b (FIG. 2B) and the deskew tuning procedure terminates.

Figure 19:
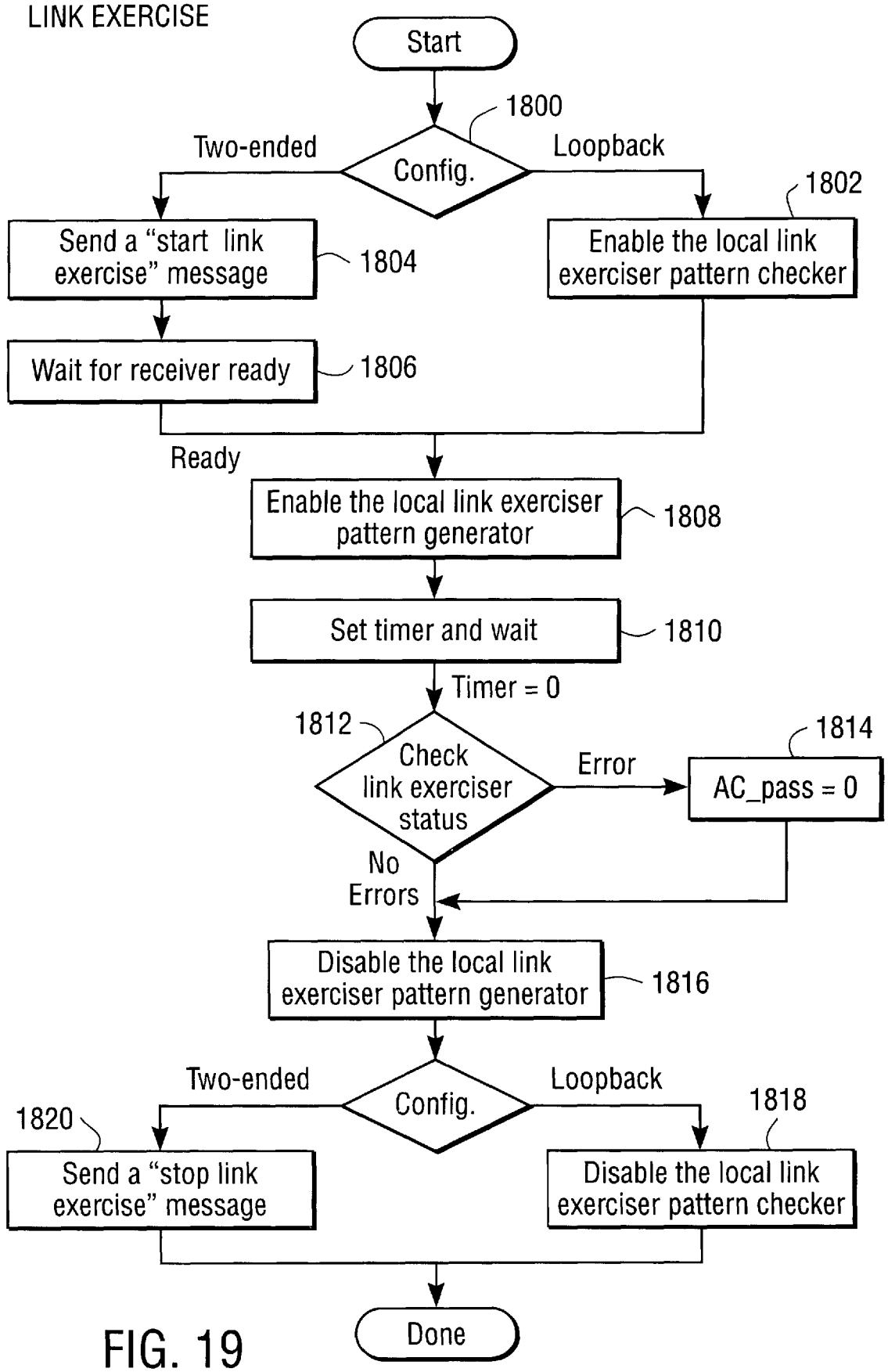
FIG. 19 is a flowchart that shows a link exercise procedure in accordance with the present invention.

FIG. 19 is a flowchart illustrating additional details of the link exercise procedure in accordance with the present invention. Assume that tuning is performed in the master-to-slave direction. The configuration 1800 of the router 105a (FIG. 1) determines the subsequent steps in the method. If a loopback configuration exists, then the link control unit 205a enables 1802 the pattern checker in the link exerciser 235a (FIG. 2A) and the method proceeds to step 1808. If a two-ended configuration exists, then the link control unit 205a sends 1804 a "START LINK EXERCISE" message to the link control unit 205b (FIG. 2B) to begin the link exercise procedure in accordance with the present invention. In step 1806, the link control unit 205a waits for a "RCVR READY" message from the link control unit 205b indicating that the receiver 365b (FIG. 2B) on the slave side is ready to function in the link exercise.

In step 1808, the link control unit 205a enables the pattern generator of the link exerciser 235a (FIG. 2A) to generate the test patterns for transmission to the receiver 365b (FIG. 2B). The link control unit 205a then sets 1810 a timer and waits. When the timer expires, the link control unit 205a checks 1812 the status signals from the link control unit 205b (for a two-ended configuration). If an error is detected, the parameter AC_PASS is set 1814 to "0" for purposes of indicating that this AC tuning iteration has failed, and the method proceeds to step 1816. If, in step 1812, no error is detected from the status signals, then the method proceeds directly to step 1816.

In step 1816, the basic control 205a disables the pattern generator of the link exerciser 235a. If a loopback configuration exists, then the link control unit 205a disables 1818 the pattern checker of the link exerciser 235a and the link exercise procedure terminates. If a two-ended configuration exists, then the link control unit 205a sends 1820 a "STOP LINK EXERCISE" message to the link control unit 205b, and the link exercise procedure terminates.

What is claimed is:

1. An apparatus for automatically initializing and tuning a link in a network system, comprising:

a first link control unit coupled to a first end of the link; and a second link control unit coupled to the second end of the link and capable of communicating with the first link control unit to achieve automatic adjustment of at least some parameters of the link to improve performance of the link, the first link control unit further comprising a main sequencer for generating control signals for adjusting the parameters of the link and for receiving status messages generated by the second link control unit, and comprising a link exerciser, coupled to the main sequencer, for generating and checking test patterns transmitted across the link.

2. The apparatus of claim 1 wherein the main sequencer comprises:

a master sequencer, coupled to the link, for providing control signals to initialize the link;

a tune receiver, coupled to the link, for generating status messages to the second link control unit; and a tune driver, coupled to the link, for generating control signals for tuning the parameters of the link.

3. An apparatus for automatically initializing and tuning across a high speed link, comprising:

a first interface circuit coupled to a first end of the link and capable of adjusting at least some parameters of the link;

a first link control unit coupled to the first interface circuit and capable of adjusting at least some parameters of the link;

a second interface circuit coupled to the second end of the link and capable of adjusting at least some parameters of the link; and a second link control unit coupled to the second interface circuit and capable of communicating with the first link control unit, the first link control unit further comprising a main sequencer for generating control signals for adjusting the parameters of the link and for receiving status messages generated by the second link control unit, and comprising a link exerciser, coupled to the main sequencer, for generating and checking test patterns across the link.

4. The apparatus of claim 3 wherein the main sequencer comprises:

a master sequencer, coupled to the link, for providing control signals to initialize the link;

a tune receiver, coupled to the link, for generating status messages to the second link control unit; and a tune driver, coupled to the link, for generating control signals for tuning the parameters of the link.

5. A method of initializing and tuning across a high speed link in a network, comprising:

performing an initialization procedure across the link;

establishing a master-to-slave relationship between a first end of the link and a second end of the link;

tuning the link in a first direction with respect to the master-to-slave relationship between the first end and the second end to adjust at least some parameters of the link; and tuning the link in a second direction with respect to the master-to-slave relationship between the first end and the second end to adjust at least some parameters of the link.

6. The method of claim 5, wherein the step of tuning the link in the first direction comprises:

determining an output DC current level of a plurality of driver circuits on the first end of the link;

determining a speed of a clock signal generated by a clock driver on the first end of the link to permit recovery of the clock signal on the second end of the link;

adjusting the phase of the clock signal from the clock driver to permit data recovery on the second end of the link;

determining an output AC current level of the plurality of driver circuits on the first end of the link;

performing a deskew tuning procedure to compensate for skew on signals at the second end of the link; and generating test patterns across the link to test data transmission across the link.

7. The method of claim 5, wherein the step of tuning the link in the second direction comprises:

determining an output DC current level of a second plurality of driver circuits on the second end of the link;

determining a speed of a second clock signal generated by a second clock driver on the second end of the link to permit recovery of the second clock signal on the first end of the link;

adjusting the phase of the second clock signal from the second clock driver to permit data recovery on the first end of the link;

determining an output AC current level of the second plurality of driver circuits on the second end of the link;

performing a deskew tuning procedure to compensate for skew on signals at the first end of the link; and generating test patterns across the link to test data transmission across the link.

8. A method of initializing and tuning across a high speed link in a network by use of a first tuning system on a first end of the link and a second tuning system on a second end of the link, comprising:

performing an initialization procedure across the link;

generating a test pattern to transmit across the link to test data transmission across the link;

receiving a status message in response to the test pattern transmitted across the link;

automatically adjusting at least some parameters of the link by use of the first tuning system and the second tuning system to improve a performance of the network across the link.

9. A method of tuning across a network link including a first plurality of drivers circuits on a first end of the link and a second plurality of driver circuits on a second end of the link, comprising:

determining an output DC current level of the first plurality of driver circuits on the first end of the link;

determining a speed of a first clock signal generated from the first end of the link;

adjusting the phase of the first clock signal to permit data recovery on the second end of the link;

determining an output AC current level of the first plurality of driver circuits on the first end of the link;

performing a deskew tuning procedure to compensate for skew on signals at the second end of the link; and generating test patterns to test data transmission from the first end to the second end of the link.

10. The method of claim 9 further comprising:

determining an output DC current level of the second plurality of driver circuits on the second end of the link;

determining a speed of a second clock signal generated from the second end of the link;

adjusting the phase of the second clock signal to permit data recovery on the first end of the link;

determining an output AC current level of the second plurality of driver circuits on the second end of the link;

performing a deskew tuning procedure to compensate for skew on signals at the first end of the link; and generating test patterns to test data transmission from the second end to the first end of the link.

11. A method of initializing a link in a network prior to adjustment of operating parameters of the link, comprising:

enabling clock signals for recovering data transmitted across the link;

enabling data drivers for transmitting data across the link;

establishing a master-to-slave relationship between a first end of the link and a second end of the link, wherein the master-to-slave relationship determines a sequence of the adjustment of the operating parameters in the link; and generating a test pattern for transmission across the link.

12. The apparatus of claim 1, further comprising:

a plurality of interface components coupled between the first end of the link and the first link control unit, and configured to process data transmitting across the link.

13. The apparatus of clam 1 wherein the first link control unit further comprises:

a receive message module coupled to the main sequencer and configured to buffer control signals from the second link control unit.

14. The apparatus of claim 13 wherein the first link control unit further comprises:

an input register coupled to the receive module and configured to receiving signals transmitting along the link.

15. The apparatus of claim 1 wherein the first link control unit further comprises:

a send message module coupled to the main sequencer and configured to buffer control signals for transmission to the second link control unit.

16. The apparatus of claim 1 wherein the first link control unit further comprises:

a multiplexer coupled to the link exerciser and configured to receive one of a group including control signals from the main sequencer, test signals from the link exerciser, and data signals received by the link control unit.

17. The apparatus of claim 16 wherein the first link control unit further comprises:

an output register coupled to the multiplexer and configured to buffer the output of the multiplexer for transmission to the link.

18. The apparatus of claim 3 wherein the first link control unit further comprises:

a receive message module coupled to the main sequencer and configured to buffer control signals from the second link control unit.

19. The apparatus of claim 18 wherein the first link control unit further comprises:

an input register coupled to the receive module and configured to receiving signals transmitting along the link.

20. The apparatus of claim 3 wherein the first link control unit further comprises:

a send message module coupled to the main sequencer and configured to buffer control signals for transmission to the second link control unit.

21. The apparatus of claim 3 wherein the first link control unit further comprises:

a multiplexer coupled to the link exerciser and configured to receive one of a group including control signals from the main sequencer, test signals from the link exerciser, and data signals received by the link control unit.

22. The apparatus of claim 21 wherein the first link control unit further comprises:

an output register coupled to the multiplexer and configured to buffer the output of the multiplexer for transmission to the link.

23. An apparatus for initializing and tuning across a high speed link in a network, comprising:

means for performing an initialization procedure across the link;

coupled to the performing means, means for establishing a master-to-slave relationship between a first end of the link and a second end of the link;

coupled to the link, means for tuning the link in a first direction with respect to the master-to-slave relationship between the first end and the second end to adjust at least some parameters of the link; and coupled to the link, means for tuning the link in a second direction with respect to the master-to-slave relationship between the first end and the second end to adjust at least some parameters of the link.

24. The method of claim 5, wherein the step of performing the initialization procedure comprises:

disabling the transmission of clock signals from the first end and from the second end of the link;

enabling the transmission of clock signals from the first end of the link and from the second end of the link;

synchronizing each of the clock signals from the first end of the link and from the second end of the link with an associated core clock signal;

checking if a resistance value at an end of the link locks at an appropriate resistance value to compensate for variations in the link;

checking if an end of the link detects the clock signal from an opposed end of the link; and enabling drivers and receivers disposed at the first end of the link and at the second end of the link.

25. The method of claim 5, further comprising:

terminating the step of tuning the link in the first direction if a loop back configuration exists for at least one of the first end of the link and the second end of the link.

26. The method of claim 5, further comprising:

reducing a frequency value of a clock signal from the first end of the link to a frequency value of a clock signal from the second end of the link.

27. The method of claim 8 wherein the step of performing the initialization procedure comprises:

disabling the transmission of clock signals from the first end and from the second end of the link;

enabling the transmission of clock signals from the first end of the link and from the second end of the link;

synchronizing each of the clock signals from the first end of the link and from the second end of the link with an associated core clock signal;

checking if a resistance value at an end of the link locks at an appropriate resistance value to compensate for variations in the link;

checking if an end of the link detects the clock signal from an opposed end of the link; and enabling drivers and receivers disposed at the first end of the link and at the second end of the link.

28. The method of claim 8, further comprising:

terminating the step of tuning the link in a first direction if a loop back configuration exists for at least one of the first end of the link and the second end of the link.

29. The method of claim 8, further comprising:

reducing a frequency value of a clock signal from the first end of the link to a frequency value of a clock signal from the second end of the link.

30. The method of claim 8 wherein the step of automatically adjusting at least some parameters of the link comprises:

determining an output DC current level of a plurality of driver circuits on the first end of the link;

determining a speed of a clock signal generated by a clock driver on the first end of the link to permit recovery of the clock signal on the second end of the link;

adjusting the phase of the clock signal from the clock driver to permit data recovery on the second end of the link;

determining an output AC current level of the plurality of driver circuits on the first end of the link;

performing a deskew tuning procedure to compensate for skew on signals at the second end of the link.

* * * * *